United States Patent
Callender et al.

(10) Patent No.: US 9,565,611 B2
(45) Date of Patent: Feb. 7, 2017

(54) WIRELESS DEVICE, NETWORK NODE AND METHODS THEREIN, COMPUTER PROGRAMS AND COMPUTER-READABLE MEDIUMS COMPRISING THE COMPUTER PROGRAMS, FOR CELL MONITORING FOR CELL RESELECTION

(71) Applicant: Telefonaktiebolaget L M Ericsson (publ), Stockholm (SE)

(72) Inventors: Christopher Callender, Kinross (GB); Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 14/409,242

(22) PCT Filed: Nov. 3, 2014

(86) PCT No.: PCT/SE2014/051292
§ 371 (c)(1),
(2) Date: Dec. 18, 2014

(87) PCT Pub. No.: WO2015/065284
PCT Pub. Date: May 7, 2015

(65) Prior Publication Data
US 2016/0255563 A1 Sep. 1, 2016

Related U.S. Application Data

(60) Provisional application No. 61/899,385, filed on Nov. 4, 2013.

(51) Int. Cl.
*H04W 4/00* (2009.01)
*H04W 36/30* (2009.01)
(Continued)

(52) U.S. Cl.
CPC ........... *H04W 36/30* (2013.01); *H04B 17/318* (2015.01); *H04L 43/16* (2013.01); *H04W 36/04* (2013.01); *H04W 36/32* (2013.01); *H04W 48/16* (2013.01)

(58) Field of Classification Search
CPC ...... H04W 36/30; H04W 36/04; H04W 36/32; H04B 17/318; H04L 43/16
(Continued)

(56) References Cited

U.S. PATENT DOCUMENTS 8,121,093 B2 * 2/2012 Chen ..................... H04W 48/20
370/331
8,265,034 B2 * 9/2012 Islam .................. H04W 76/068
370/310
(Continued)

OTHER PUBLICATIONS

International Search Report and Written Opinion for PCT/SE2014/051292, mailed Mar. 11, 2015, 18 pages.
(Continued)

*Primary Examiner* — Marceau Milord
(74) *Attorney, Agent, or Firm* — Withrow & Terranova, PLLC

(57) ABSTRACT

A wireless device obtains information associated with N layers, which may be used for cell reselection. The information comprises which M layers out of the N layers are to be used for monitoring according to detection and measurement requirements for absolute priority reselection. The wireless device monitors layers, of any priority, only out of the M layers, when one or more first signal measurements on a serving cell are below or equal to a first threshold, or when one or more second signal measurements on the serving cell are below or equal to a second threshold. The wireless device monitors layers with a priority higher than a priority of the serving layer out of the N layers when the one or more
(Continued)

first signal measurements are above the first threshold, and when the one or more second signal measurements are above the signal threshold.

42 Claims, 5 Drawing Sheets

(51) Int. Cl.
| | |
|---|---|
| *H04W 48/16* | (2009.01) |
| *H04B 17/318* | (2015.01) |
| *H04L 12/26* | (2006.01) |
| *H04W 36/04* | (2009.01) |
| *H04W 36/32* | (2009.01) |

(58) Field of Classification Search
USPC ............ 455/437, 436, 434, 450, 574, 452.2
See application file for complete search history.

(56) References Cited

U.S. PATENT DOCUMENTS

| | | | | |
|---|---|---|---|---|
| 8,300,596 | B2* | 10/2012 | Huang | H04W 36/0088 370/331 |
| 8,411,555 | B2* | 4/2013 | Kazmi | H04W 36/30 370/208 |
| 8,649,790 | B2* | 2/2014 | Kazmi | H04W 36/32 370/331 |
| 8,909,229 | B2* | 12/2014 | Martin | H04W 36/0094 370/331 |
| 8,953,554 | B2* | 2/2015 | Kazmi | H04W 36/24 370/331 |
| 8,996,005 | B2* | 3/2015 | Wu | H04W 36/0066 455/436 |
| 9,020,481 | B1* | 4/2015 | Monin | H04W 52/0212 370/338 |
| 2009/0247162 | A1* | 10/2009 | Yasuoka | H04W 36/32 455/436 |
| 2013/0084850 | A1 | 4/2013 | Martin et al. | |
| 2013/0084866 | A1 | 4/2013 | Martin et al. | |
| 2013/0210437 | A1 | 8/2013 | Martin et al. | |
| 2013/0225169 | A1* | 8/2013 | Farnsworth | H04W 60/04 455/436 |
| 2013/0242774 | A1* | 9/2013 | Wang | H04W 36/30 370/252 |
| 2013/0273920 | A1* | 10/2013 | Magadi Rangaiah | H04W 48/20 455/437 |

OTHER PUBLICATIONS

Author Unknown, "Technical Specification Group Radio Access Network; Requirements for support of radio resource management (FDD) (Release 8)," Technical Specification 25.133, Version 8.10.0, 3GPP Organizational Partners, Mar. 2010, 236 pages.

Author Unknown, "Technical Specification Group Radio Access Network; User Equipment (UE) procedures in idle mode and procedures for cell reselection in connected mode (Release 8)," Technical Specification 25.304, Version 8.5.0, 3GPP Organizational Partners, Mar. 2009, 48 pages.

Author Unknown, "Technical Specification Group Radio Access Network; User Equipment (UE) procedures in idle mode and procedures for cell reselection in connected mode (Release 8)," Technical Specification 25.304, Version 8.8.0, 3GPP Organizational Partners, Dec. 2009, 49 pages.

Author Unknown, "Technical Specification Group Radio Access Network; Evolved Universal Terrestrial Radio Access (E-UTRA); Requirements for support of radio resource management (Release 8)," Technical Specification 36.133, Version 8.10.0, 3GPP Organizational Partners, Jun. 2010, 328 pages.

Author Unknown, "Technical Specification Group Radio Access Network; Evolved Universal Terrestrial Radio Access (E-UTRA); User Equipment (UE) procedures in idle mode (Release 8)," Technical Specification 36.304, Version 8.5.0, 3GPP Organizational Partners, Mar. 2009, 30 pages.

Author Unknown, "Technical Specification Group Radio Access Network; Evolved Universal Terrestrial Radio Access (E-UTRA); User Equipment (UE) procedures in idle mode (Release 8)," Technical Specification 36.304, Version 8.8.0, 3GPP Organizational Partners, Dec. 2009, 30 pages.

* cited by examiner

WIRELESS DEVICE, NETWORK NODE AND METHODS THEREIN, COMPUTER PROGRAMS AND COMPUTER-READABLE MEDIUMS COMPRISING THE COMPUTER PROGRAMS, FOR CELL MONITORING FOR CELL RESELECTION

This application is a 35 U.S.C. §371 national phase filing of International Application No. PCT/SE2014/051292, filed Nov. 3, 2014, which claims priority to U.S. Provisional Application No. 61/899,385, filed Nov. 4, 2013, the disclosures of which are incorporated herein by reference in their entireties.

TECHNICAL FIELD

The present disclosure relates generally to a method and a wireless device, of cell monitoring for cell reselection. The present disclosure also relates generally to a method and a network node for determining information for the wireless device to perform the cell reselection. The present disclosure further relates generally to computer programs and computer-readable storage mediums, having stored thereon the computer programs to carry out these methods.

BACKGROUND

Communication devices such as terminals are also known as e.g. User Equipments (UE), wireless devices, mobile terminals, wireless terminals and/or mobile stations. Terminals are enabled to communicate wirelessly in a cellular communications network, also referred to as wireless communication system, cellular radio system or cellular network. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cells, wherein each cell being served by an access node such as a Base Station (BS), e.g. a Radio Base Station (RBS), which sometimes may be referred to as e.g. Evolved Node B, base station ("eNB", "eNodeB", "NodeB", "B node"), or BTS (Base Transceiver Station), depending on the technology and terminology used. The base stations, based on transmission power and thereby also cell size, may be of different classes such as e.g. macro eNodeB, home eNodeB or pico base station. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Cell Reselection

Cell reselection or simply reselection may be used by the UE for selecting a target cell, typically in low activity Radio Resource Control (RRC states). But it may also be used in some moderate to high RRC activity states. Examples of low activity RRC states are idle state in Evolved Universal Terrestrial Radio Access (E-UTRA), idle mode in Universal Terrestrial Radio Access (UTRA), Cell Paging CHannel (CELL_PCH) state in UTRA, Universal Terrestrial Radio Access Network (UTRAN) Registration Area Paging (CHannel URA_PCH) state in UTRA and Cell Forward Access CHannel (CELL_FACH) state in UTRA. The CELL_FACH state in UTRA may also be regarded as a moderate RRC state in terms of traffic activity. Nevertheless, in all these states, the cell reselection may be performed by the UE.

The target cell may typically be the strongest cell in terms the received signal quality at the UE, or it may also be a cell associated with higher priority, etc. . . .

Priority Based Cell Reselection

Absolute priority cell reselection, also referred to herein as absolute priority reselection, was defined in 3GPP TS 36.304, release 8, version 8.8.0, and TS 25.304, release 8, version 8.8.0, for both UTRA and Evolved Universal Terrestrial Radio Access (E-UTRA) inter-frequency reselection, as well as reselections between UTRA, E-UTRA, Global System for Mobile communication (GSM) and Code Division Multiple Access 2000 (CDMA2000), e.g., CDMA2000 1× Round-Trip Time (RTT) and High Rate Packet Data (HRPD). In the future, cell reselection between UTRA or E-UTRA and Wireless Local Area Network (WLAN) may also be introduced. In absolute priority reselection, each frequency layer may be assigned an absolute priority by the UTRA or E-UTRA network. 'Layer' is interchangeably used with other similar terms such as carrier frequency, frequency layer and carrier. But all of them bear the same meaning, namely, a group of cells which may be measured by a wireless device. For example, for GSM, a group of up to 32 cells may be considered a layer. Further description for layer will be provided later. An absolute priority may be lower, equal or higher compared to the priority of the serving frequency layer. The priority is so-called absolute because it is assigned in terms of absolute numbers, e.g., 0 to 7.

When the serving cell signal strength and quality are good, the UE may only search for layers with a higher priority than the serving layer, and this search is done relatively infrequently. The minimum requirement to perform this search may be every $T_{higher\_priority\_search} * N_{layers}$ according to TS25.133, v8.10.0, and TS36.133, v8.10.0. $T_{higher\_priority\_search}$ is a search time for the higher priority search fixed at 60 s by TS25.133, v8.10.0 and TS36.133, versions 8.10.0, and $N_{layers}$ is the number of higher priority layers which have been configured.

The signal strength, e.g., Srxlev in TS 25.133, v8.10.0, or TS 36.133, v8.10.0, and signal quality, e.g., Squal in TS 25.133, v8.10.0, or TS 36.133, v8.10.0, may be derived from UE measurements and additional parameters signaled by the network node. Examples of UE measurements used for deriving signal strength and signal quality for cell reselection procedures are Common Pilot Channel (CPICH) Received Signal Code Power (RSCP) and CPICH chip Energy/Noise (Ec/No) respectively in UTRA, and Reference Signal Received Power (RSRP) and Reference Signal Received Quality (RSRQ) respectively in E-UTRA.

When the serving cell signal strength or quality go below configured thresholds, e.g., Srxlev≤$S_{nonIntraSearchP}$ or Squal≤$S_{nonIntraSearch}$ in TS 25.133 v8.10.0 or TS 36.133 v8.10.0, then the UE may search for and measure inter-frequency layers of higher, equal or lower priority in preparation for possible reselection. The thresholds $S_{nonIntraSearchP}$ and $S_{nonIntraSearchQ}$ may be typically configured, such that UEs may start to perform non intrafrequency measurements before the serving cell signal strength and quality fails to meet suitability criteria, as defined in TS25.304, v8.5.0, and TS36.304, v8.5.0, respectively. Cell detection and measurement on frequency layers, of higher, equal or lower priority, is performed at a greater intensity than the high priority search, since the UE may be assumed to be reaching the edge of coverage of the serving frequency. In this scenario, according to existing methods, all layers are currently considered equally as candidates for reselection. Therefore, for coverage reselections, when e.g., Srxlev≤$S_{nonIntraSearchP}$ or Squal≤$S_{nonIntraSearchQ}$, the aforementioned cell detection and evaluation delays may be scaled by the total number of carriers on each Radio Access Technology (RAT), regardless of priority.

With the existing methods for cell reselection, UEs may go out of service before the cell reselection process is completed. Once a UE is out of service, it may not get any cellular service until it has performed cell selection procedures, which may correspond to a significant delay, and there may also be additional signaling load when the UE finds a suitable cell and performs registration.

SUMMARY

It is an object of embodiments herein to improve the performance in a cellular network by providing an improved way for a wireless device to perform cell monitoring for cell reselection.

According to a first aspect of embodiments herein, the object is achieved by a method performed by a wireless device of cell monitoring for cell reselection. The wireless device operates in a wireless communications network. The wireless device obtains information associated with N layers. The information may be used by the wireless device for at least cell reselection. The information comprises which M layers out of the N layers are to be used by the wireless device for monitoring according to detection and measurement requirements for absolute priority reselection. Each of the N layers, and a serving layer of the wireless device is assigned an absolute priority. The wireless device monitors layers, of any priority, only out of the M layers, when one or more first signal measurements on a serving cell of the wireless device are below or equal to a first signal threshold, or when one or more second signal measurements on the serving cell are below or equal to a second signal threshold. The wireless device monitors layers with a priority higher than a priority of the serving layer out of the N layers, when the one or more first signal measurements on the serving cell are above the first signal threshold, and when the one or more second signal measurements on the serving cell are above the second signal threshold.

According to a second aspect of embodiments herein, the object is achieved by a method performed by the network node for determining information for the wireless device to perform cell reselection. The network node and the wireless device operate in the wireless communications network. The network node determines information associated with N layers. The information may be used by the wireless device for at least cell reselection. The information comprises which M layers out of the N layers are to be used by the wireless device for monitoring according to detection and measurement requirements for absolute priority reselection. Each of the N layers, and the serving layer of the wireless device is assigned an absolute priority. The absolute priority reselection, wherein layers, of any priority, only out of the M layers are monitored by the wireless device, is performed when the one or more first signal measurements by the wireless device on the serving cell of the wireless device are below or equal to the first signal threshold, or when the one or more second signal measurements by the wireless device on the serving cell are below or equal to the second signal threshold. The information also comprises which high priority layers out of the N layers are to be used by the wireless device for monitoring only during a higher priority search, which is performed when the one or more first signal measurements on the serving cell are above the first signal threshold, and when the one or more second signal measurements on the serving cell are above the second signal threshold. The network node sends the information associated with the N layers, to the wireless device.

According to a third aspect of embodiments herein, the object is achieved by the wireless device configured to perform cell monitoring for cell reselection. The wireless device is adapted to operate in the wireless communications network. The wireless device comprises an obtaining circuit configured to obtain the information associated with the N layers. The information may be used by the wireless device for at least cell reselection. The information comprises which M layers out of the N layers are to be used by the wireless device for monitoring according to detection and measurement requirements for absolute priority reselection. Each of the N layers, and the serving layer of the wireless device is assigned an absolute priority. The wireless device also comprises a monitoring circuit configured to monitor layers, of any priority, only out of the M layers, when the one or more first signal measurements on the serving cell of the wireless device are below or equal to the first signal threshold, or when the one or more second signal measurements on the serving cell are below or equal to the second signal threshold. The monitoring circuit is further configured to monitor layers with a priority higher than the priority of the serving layer out of the N layers, when the one or more first signal measurements on the serving cell are above the first signal threshold, and when the one or more second signal measurements on the serving cell are above the second signal threshold.

According to a fourth aspect of embodiments herein, the object is achieved by the network node adapted to determine information for the wireless device to perform cell reselection. The network node and the wireless device are adapted to operate in the wireless communications network. The network node comprises a determining circuit configured to determine information associated with the N layers. The information may be used by the wireless device to perform at least cell reselection. The information comprises which M layers out of the N layers are to be used by the wireless device for monitoring according to detection and measurement requirements for absolute priority reselection. Each layer of the N layers, and the serving layer of the wireless device is assigned an absolute priority. The absolute priority reselection, wherein layers, of any priority, only out of the M layers, are monitored by the wireless device, is configured to be performed when the one or more first signal measurements by the wireless device on the serving cell of the wireless device are below or equal to the first signal threshold, or when the one or more second signal measurements by the wireless device on the serving cell are below or equal to the second signal threshold. The information also comprises which high priority layers out of the N layers are to be used by the wireless device for monitoring only during a higher priority search, which is configured to be performed when the one or more first signal measurements on the serving cell are above the first signal threshold, and when the one or more second signal measurements on the serving cell are above the second signal threshold. The network node also comprises a sending circuit configured to send the information associated with the N layers, to the wireless device.

According to a fifth aspect of embodiments herein, the object is achieved by a computer program, comprising instructions which, when executed on at least one processor, cause the at least one processor to carry out the method according to any one of the embodiments described for the method in the wireless device.

According to a sixth aspect of embodiments herein, the object is achieved by a computer-readable storage medium, having stored thereon a computer program, comprising instructions which, when executed on at least one processor, cause the at least one processor to carry out the method according to any one of the embodiments described for the method in the wireless device.

According to a seventh aspect of embodiments herein, the object is achieved by a computer program, comprising instructions which, when executed on at least one processor, cause the at least one processor to carry out the according to any one of the embodiments described for the method in the network node.

According to an eighth aspect of embodiments herein, the object is achieved by a computer-readable storage medium, having stored thereon a computer program, comprising instructions which, when executed on at least one processor, cause the at least one processor to carry out the method according to any one of the embodiments described for the method in the network node.

By obtaining the information associated with the N layers, which comprises which are the M layers, the wireless device knows to monitor only layers out of the M layers when the carrier conditions are poor. That is, when the one or more first signal measurements are below or equal to the first signal threshold, e.g. indicating poor signal strength, or when one or more second signal measurements are below or equal to the second signal threshold, e.g. indicating poor signal quality, the wireless device monitors only layers out of the M layers. By monitoring only layers out of the M layers, and not all of the N layers, cell detection and measurement of the remaining N-M layers does not delay reselection to the M layers when the wireless device needs to perform a reselection for coverage purposes. That is, any delays that may otherwise be caused by monitoring the remaining layers N-M layers, are saved. Moreover, the wireless device is able to save the radio resources that may be necessary to monitor the remaining layers. That is, the N-M layers. Therefore, the performance of the wireless communications network is improved, and so is the satisfaction of users operating in such network.

An advantage of the embodiments herein may be that mobile operators may include additional layers in the neighbor list to facilitate wireless devices 150 which are in good coverage to perform reselections for load balancing or offload purposes. Wireless devices 150 in good coverage may search for these additional layers. For wireless devices 150 in poor coverage, according to embodiments herein, the additional layers provided for load balancing or offload purposes may not increase the reselection delay, and may also not increase the power consumption of the wireless device 150, because the additional layers may not need to be searched for or measured.

Another advantage may be that the operators who have larger spectrum holding may effectively and efficiently utilize their spectrum for mobile communications. This is because larger spectrum means larger number of carriers available to the operators. If all or several of these carriers are used according to existing cell reselection principles, then cell reselection will become unnecessary longer. However the disclosed method reduces the cell reselection delay for at least certain number of carriers.

Yet another advantage is that the mobility performance for at least certain minimum number of layers, i.e., M layers, is not degraded even though the total number of layers N for monitoring may be increased to a larger number. This is because the minimum number of layers, M, may be measured at much faster rate compared to the remaining N-M layers.

By providing for a faster method of monitoring layers for cell reselection when carrier conditions are poor, for example, when a wireless device may come to a boundary where interfrequency reselection is needed to stay in coverage, thanks to the methods disclosed herein, the cell reselection may occur in time, and the wireless device continue stay in service once the serving cell no longer meets suitability criteria, avoiding delays and service interruptions.

BRIEF DESCRIPTION OF THE DRAWINGS

Examples of embodiments herein are described in more detail with reference to the accompanying drawings, in which.

DETAILED DESCRIPTION

Figure 1:
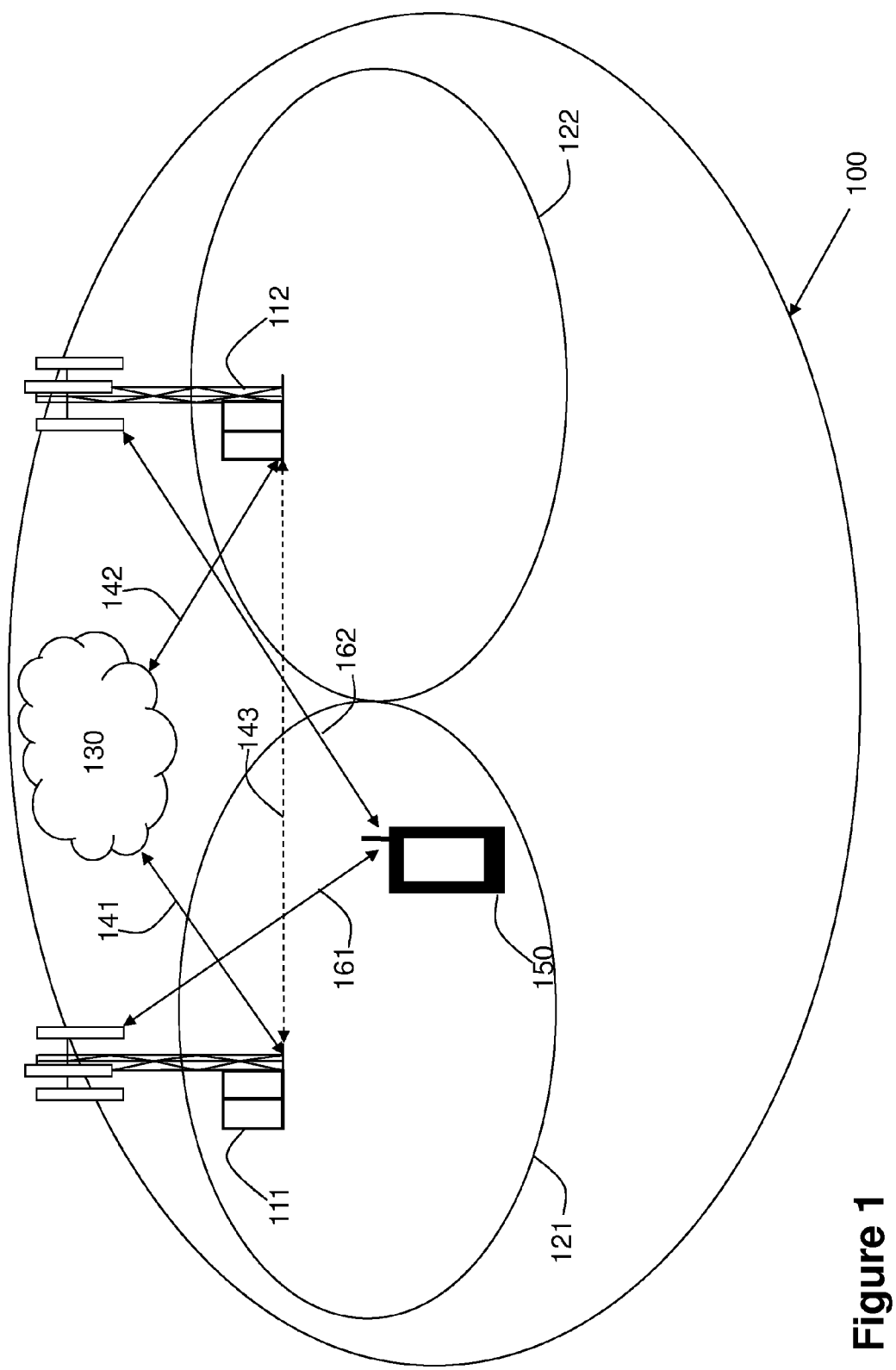
FIG. 1 is a schematic block diagram illustrating embodiments in a wireless communications network, according to some embodiments.

As part of the solution according to embodiments herein, one or more problems that may be associated with use of at least some of the existing methods will first be identified and discussed.

Mobile operators participating in 3GPP have been requesting an increased capability of wireless devices, e.g., UE capability, to measure more carriers in idle mode, for both UTRA and E-UTRA. Release 8-11 specifications set a minimum requirement for a UE to be able to monitor 2 inter-frequency carriers in UTRA and 3 inter-frequency Frequency Division Duplex (FDD) and 3 inter-frequency Frequency Division Duplex (TDD) carriers in E-UTRA, as well as corresponding inter RAT capabilities. Due to the increased number of frequency bands deployed, there is a desire to increase these numbers, for example for E-UTRA FDD to monitor 8 or more frequency layers for cell reselection.

A way to increase the number of layers may be to extend the current approach, where cell detection and evaluation delays for cell reselection are scaled by the number of frequencies, e.g., $N_{freq}$ according to TS25.133, v8.10.0, and TS36.133, v8.10.0. This approach has been used in the past because it allows for good UE power consumption. However, if this is extended, the cell detection and evaluation delays may become excessive, and cell reselections may fail when UEs reach the edge of coverage on one layer. The excessive delay, as there is not enough time to reselect, may also result in loss of paging reception.

The problem may be illustrated by a numerical example, where a UE is configured to measure $N_{freq}$=8 E-UTRA layers, and a typical 1.28 seconds idle mode Discontinuous Reception (DRX) cycle is configured. According to TS36.133, v.8.10.0, UEs are required to detect new E-UTRA interfrequency cells within 32*8=256 seconds, wherein 32 is a fixed number to ensure sufficient power saving for the DRX cycle, and evaluate known E-UTRA interfrequency cells within 6.4*8=51.2 seconds, wherein 6.4 is a fixed number to ensure sufficient power saving for the DRX cycle. Considering a 100 kilometer (km)/hour (h) UE, the UE may travel approximately 7.1 km during the cell detection delay, and 1.4 km during the evaluation period. The evaluation period is the period when the UE is able to evaluate the cell, or cells, for cell reselection. Considering typical E-UTRA cell sizes, it may be seen that this performance is not sufficient for good idle mode reselections and mobility. This means that when UEs come to a boundary where interfrequency reselection is needed to stay in coverage, the reselection may not occur in time, and in this case, UEs may instead go out of service once the serving cell no longer meets suitability criteria. Once a UE is in this out of service state, it may not get any cellular service until it has performed cell selection procedures, which may correspond to a much longer delay than the reselection evaluation period specified in the standard for the case when the UE is in service state. This is because, from a specification point of view, there are no minimum requirements for the delay to select a suitable cell when the wireless device is in out of service, i.e. the delay is indeterminate, and there may well also be additional signaling load when the UE finds a suitable cell and performs registration.

Technically, it may be possible to require increased UE measurement activity in idle states, but this is an undesirable approach, because it may increase UE power consumption significantly and it may lead to a poor standby time.

Embodiments herein address the foregoing by providing, among others, methods that may comprise a method in a wireless device of applying one or more pre-defined rules for reselection procedure as described herein. A neighbour list may be signaled by a network node to the wireless device, and it may be divided into two parts. If there are e.g., N frequency layers, or simply layers, in the neighbor cell list, the first M layers indicated in the list may be measured and reselected by the wireless device according to existing specifications of absolute priority reselection. For the remaining N–M layers, these are only considered during the higher priority search, which is performed when a serving cell of the wireless device satisfies, e.g., Srxlev>$S_{nonIntraSearchP}$ and Squal>$S_{nonIntraSearchQ}$, that is, when the carrier conditions are good. They are not considered as reselection candidates when e.g., Srxlev≤$S_{nonIntraSearchP}$ or Squal≤$S_{nonIntraSearchQ}$, that is, when the carrier conditions are poor. It is understood that N–M layers refers to N minus M layers, or (N–M). Hence, cell detection and measurement of the remaining N–M layers does not delay cell reselection beyond a specified cell reselection delay to the first M layers when the wireless device needs to perform a reselection for coverage purposes.

Embodiments herein may also provide a method in a network node for managing or controlling a wireless device cell reselection procedure, of: a) determining which of the M out of N frequency layers are to be measured and reselected by the wireless device according to existing specifications of absolute priority reselection, and which of the remaining N–M frequency layers are only to be considered during the higher priority search, which is performed when the serving cell satisfies, e.g., Srxlev>$S_{nonIntraSearchP}$ and Squal>$S_{nonIntraSearchQ}$, that is, when the carrier conditions are good; and b) signaling the information about the determined parameters M and N–M to the wireless device enabling it to adapt its cell reselection procedures.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

FIG. 1 depicts a wireless communications network 100 in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (WiMax), or any cellular network or system.

The wireless communications network 100 comprises a network node 111 and another network node 112. Each of the network node 111 and the another network node 112 may be, for example, base stations such as e.g., an eNB, eNodeB, or a Home Node B, a Home eNode B, femto Base Station, BS, pico BS or any other network unit capable to serve a device or a machine type communication device in a wireless communications network 100. In some particular embodiments, the network node 111 or the another network node 112 may be a stationary relay node or a mobile relay node. The wireless communications network 100 covers a geographical area which is divided into cell areas, wherein each cell area is served by a network node, although, one network node may serve one or several cells. In the examples depicted in FIG. 1, the network node 111 serves a serving cell 121, and the another network node 112 serves another cell 122. Each of the network node 111 and the another network node 112 may be of different classes, such as e.g. macro eNodeB, home eNodeB or pico base station, based on transmission power and thereby also cell size. Typically, the wireless communications network 100 may comprise more cells similar to 121 and 122, served by their respective network nodes. This is not depicted in FIG. 1 for the sake of simplicity. Each of the network node 111 and the another network node 112 may support one or several communication technologies, and its name may depend on the technology and terminology used. In 3GPP LTE network nodes such as the network node 111 and the another network node 112, which may be referred to as eNodeBs or even eNBs, may be directly connected to one or more networks 130, e.g., core networks or the internet. The network node 111 may communicate with the one or more networks 130 over a link 141. The another network node 112 may communicate with the one or more networks 130 over a link 142. The network node 111 may communicate with the another network node 112 over a radio link 143.

A number of wireless devices are located in the wireless communications network 100. In the example scenario of FIG. 1, only one wireless device is shown, a wireless device 150. Any reference to a "user", "users" or "UE" herein is meant to comprise a reference to the wireless device 150, indistinctively, unless noted otherwise. The wireless device 150 may communicate with the network node 111 over a radio link 161, and with the second node over a radio link 162.

The wireless device 150 herein may be any type of wireless device capable of communicating with network node 111, or another wireless device, over radio signals. The wireless device 150 may also be a radio communication device, target device, device to device wireless device, machine type wireless device or wireless device capable of machine to machine communication, a sensor equipped with wireless device, iPAD, Tablet, mobile terminals, smart phone, laptop embedded equipped (LEE), laptop mounted equipment (LME), USB dongles, Customer Premises Equipment (CPE) etc. . . .

The wireless device 150 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless communications network 100.

The wireless device 150 may further be referred to as a mobile telephone, cellular telephone, or laptop with wireless capability, just to mention some further examples. The wireless device 150 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system. Further examples of different wireless devices, such as the wireless device 150, that may be served by such a system include, modems, or Machine Type Communication (MTC) devices such as sensors.

In the description herein, a reference to wireless devices of similar characteristics to the wireless device 150 may be made as "wireless devices 150", in the plural form.

Also in some embodiments generic terminology, such as "radio network node" or simply "network node (NW node)", may be used. It may be any kind of network node 111 or another network node 112, which may comprise: a base station, which may be of any power class e.g. macro, pico, micro, femto base station etc. . . . , radio base station, base transceiver station, base station controller, network controller, evolved Node B (eNB), Node B, relay node, positioning node, Evolved Serving Mobile Location Centre (E-SMLC), location server, repeater, access point, radio access point, Remote Radio Unit (RRU) Remote Radio Head (RRH), multi-standard radio (MSR) radio node such as MSR BS nodes in distributed antenna system (DAS), Self-Organizing Networks (SON) node, Operation and Maintenance (O&M), Operations Support System (OSS), Minimization of Drive Tests (MDT) node, Core network node, Mobility Management Entity (MME) etc. . . .

Figure 2:
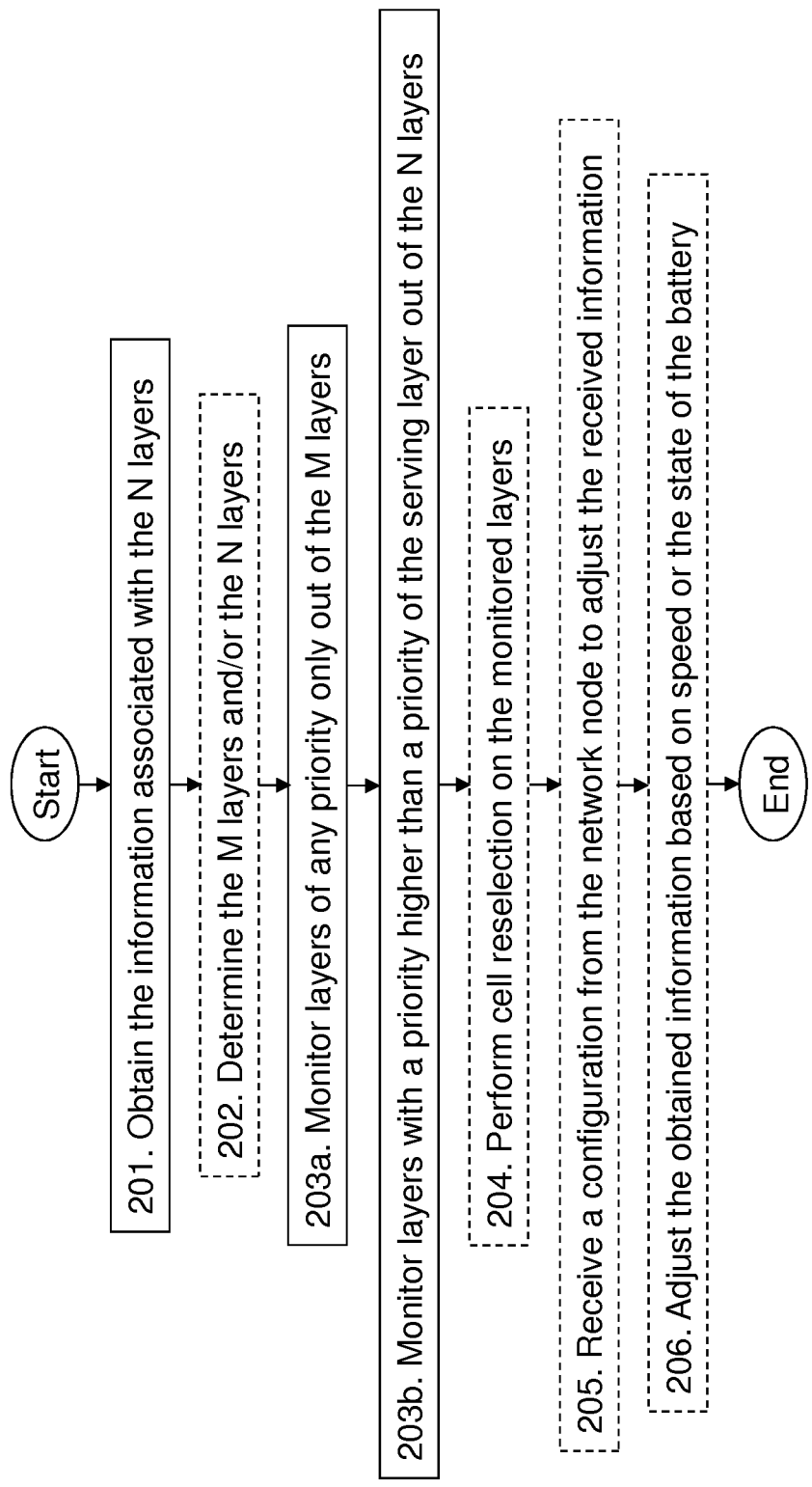
FIG. 2 is a flowchart illustrating embodiments of a method in a wireless device, according to some embodiments.

Embodiments of a method performed by the wireless device 150 of cell monitoring for cell reselection, will now be described with reference to the flowchart depicted in FIG. 2. The wireless device 150 operates in the wireless communications network 100, as stated earlier. FIG. 2 depicts a flowchart of the actions that are or may be performed by the wireless device 150 in embodiments herein. Discontinued lines depict optional actions.

The method may comprise the following actions, which actions may as well be carried out in another suitable order than that described below. In some embodiments, all the actions may be carried out, whereas in other embodiments only some action/s may be carried out.

The embodiments herein are applicable to cell reselection procedure in any RRC state, e.g. idle, idle mode, CELL_PCH, URA_PCH, CELL_FACH etc. . . .

Action 201

In order for the wireless device 150 to know which layers it may monitor, so that the wireless device 150 may monitor the adequate layers to perform cell reselection efficiently, the wireless device 150 obtains information associated with N layers, e.g., a list of N layers. Layers are described below. The information may be used by the wireless device 150 for at least cell reselection. In some embodiments, the information may be used by the wireless device 150 for cell monitoring. The information comprises which M layers out of the N layers are to be used by the wireless device 150 for monitoring according to detection and measurement requirements for absolute priority reselection. That is, by obtaining the information about the M layers, the wireless device 150 may not need to monitor all of the N layers according to the absolute priority cell reselection. Each of the N layers, and the serving layer of the wireless device 150 is assigned an absolute priority, e.g., by the wireless communications network 100. The absolute priority may be a number between 0-7 assigned to each frequency and the serving frequency by the network. The wireless device 150 may then compare if the priorities are lower, equal or higher based on comparing the assigned numbers.

In some embodiments, the absolute priority cell reselection is performed when one or more first signal measurements by the wireless device 150 on the serving cell 121 of the wireless device 150 are below or equal to a first signal threshold, or when one or more second signal measurements by the wireless device 150 measured on the serving cell 121 are below or equal to a second signal threshold. That is, when the carrier conditions of the serving cell 121 are poor and the wireless device 150 may need to perform a cell reselection to avoid losing coverage.

In some embodiments, at least one of the one or more first signal measurements and the one or more second signal measurements is one of: one or more signal strength measurements and one or more signal quality measurements.

In some embodiments, the first signal threshold is a signal strength threshold and the second signal threshold is a signal quality threshold.

In some particular embodiments, the absolute priority reselection is performed when one or more signal strength measurements by the wireless device 150 on the serving cell 121 of the wireless device 150 are below or equal to a first signal threshold, or when one or more signal quality measurements by the wireless device 150 measured on the serving cell 121 are below or equal to a second signal threshold. In some of these embodiments, as stated earlier, the first signal threshold is the signal strength threshold and the second signal threshold is the signal quality threshold.

In some embodiments 'layer' is interchangeably used with other similar terms such as carrier frequency, frequency layer and carrier. But all of them bear the same meaning, namely, a group of cells which may be measured by the wireless device 150 without retuning the Radio Frequency (RF) local oscillator, except for GSM, where any group of up to 32 cells constitutes a 'layer'. The layer may be an inter-frequency carrier, inter-RAT carrier, e.g., E-UTRA TDD, UTRA FDD, UTRA TDD, GSM/GERAN, CDMA2000, HRPD etc. . . . , if the wireless device 150 is camped to E-UTRA FDD, or even a Secondary Component Carrier (SCC) in multi-carrier operation, a.k.a. carrier aggregation.

Thus, in some embodiments, each layer is related to a respective carrier frequency.

Thus, the obtaining of the information may be performed in several ways.

In some embodiments, the obtaining the information associated with the N layers, e.g., the list of N layers, comprises receiving the information from the network node 111 operating in the wireless communications network 100.

A network node, such as network node 111, managing or assisting the cell reselection of one or a plurality of wireless devices 150, may create a neighbor list, or any measurement control message, which contains at least a plurality of layers. The message may be signaled to the wireless device 150, typically, in a broadcast message as part of system information, e.g., in one or more system information blocks (SIBs). The message may also be signaled to the wireless device 150 in a dedicated message or any wireless device 150 specific message, i.e., UE specific message, e.g., in one or more system information blocks (SIBs) sent on a dedicated channel such as Physical Downlink Shared CHannel (PDSCH) in E-UTRA or High Speed Downlink Shared Channel (HS-DSCH) in UTRA. The wireless device 150 may use the received information for idle mode procedures or for procedures in other low activity states, e.g., for monitoring one or a plurality of layers, and for performing cell reselection. The rules disclosed herein may be applicable for inter-frequency cell reselection, inter-RAT cell reselection, or inter-RAT cell reselection for only certain RAT, e.g., only E-UTRA to UTRA or UTRA to E-UTRA. The rules may be pre-defined in a standard and may be applied by the wireless device 150 when performing the cell reselection. The set of rules are described below.

The neighbour list containing at least information about the layers, up to N, may be divided into two parts: M layers and N–M layers. The information about the layers may be absolute frequency number or absolute frequency channel number, or simply absolute channel number. Examples of absolute frequency number are Absolute Radio Frequency Channel Number (ARFCN), UMTS Absolute Radio Frequency Channel Number (UARFCN), Evolved Universal Terrestrial Radio Access Network (E-UTRAN) Absolute Radio Frequency Channel Number (EARFCN) etc. . . . .

Thus, in some embodiments, the wireless device 150 may, for example, receive at least a list of N layers for monitoring and cell reselection from the network node 111. The maximum value of N layers may be specified in the standard, e.g., $N \leq 4$ for UTRA and $N \leq 8$ for E-UTRA for inter-frequency reselection, or $N \leq 8$ for UTRA and $N \leq 12$ for E-UTRA for inter-frequency and inter-RAT cell reselection.

In some embodiments, the obtaining the information associated with the N layers, e.g., the list of N layers, is performed autonomously by the wireless device 150, based on internal information in the wireless device 150.

In some embodiments, the obtaining the information associated with the N layers, e.g., the list of N layers, is performed based on pre-defined rules or pre-defined values.

Thus, in some embodiments, the information comprises at least one of: a pre-defined rule and a pre-defined identifier. That is, for example, the M and N layers, or the N–M layers may be derivable from a pre-defined rule specifying some requirements the M, N or M–N layers may meet to be identified as such. Otherwise, the M, N or M–N layers may be explicitly derivable with a pre-defined identifier.

In one example, a rule may be pre-defined that, if there are N layers in the neighbor cell list, the first M layers indicated in the list are measured, or monitored, and reselected, according to the rule defined in existing specifications of absolute priority reselection. Alternatively, any other rule that uniquely identifies M layers from the list may be used, for example, the last M layers in the list. The network node 111, when sending the list of N layers may therefore also comply with this rule to ensure that the wireless device 150 receives correct information about the M layers.

In another example, each of the M layers is tagged with a pre-defined identifier by the network node 111, e.g. ID=0 indicating layers to be treated as normal layers, i.e. to be measured, or monitored, and reselected according to the rule defined in existing specifications.

In yet another example, a maximum M layers, e.g., 3 in E-UTRA and 2 in UTRA for inter-frequency, may be pre-defined in the standard. The network node 111 may use the first or second approach described above to enable the wireless device 150 to uniquely determine the M layers. In case the network node 111 sends M+K layers which are more than the pre-defined number, then the wireless device 150 may use only the initial M layers in the list, or any of the M layers in the list for measured, or monitored, and reselected according to the rule defined in existing specifications of absolute priority reselection. It may also be pre-defined that the wireless device 150 measures them, i.e., K layers, and uses them for reselection during the higher priority search, i.e., rule described in step 3 below.

In some embodiments, the information associated with the N layers comprising which M layers out of the N layers are to be used by the wireless device 150 for monitoring according to detection and measurement requirements for absolute priority reselection, comprises an indication that N−M layers are to be used for monitoring only when the one or more first signal measurements on the serving cell 121 are above the first signal threshold, and when the one or more second signal measurements on the serving cell 121 are above the second signal threshold. That is, the N−M layers may only be considered for monitoring when the carrier conditions of the serving cell 121 are good. Under these good carrier conditions, the wireless device 150 may be in a position to afford a longer delay in finding an alternative cell. A longer delay may be involved in monitoring a larger number of layers, than just the M layers.

In some embodiments, the information further comprises at least one of: an absolute frequency number, a frequency channel number, and an absolute channel number.

In some embodiments, the information further comprises an index to a list of at least one of: absolute frequency numbers, frequency channel numbers or absolute channel numbers. Examples of absolute frequency number are ARFCN, UARFCN, EARFCN etc.

Action 202

The wireless device 150 may determine the M layers and/or the N layers based on one of: the received information, internal information in the wireless device 150, and pre-defined values. That is, in this action, the wireless device 150 may derive the identity of the M and/or the N layers. This is an optional action.

The wireless device 150 may, for example, determine that at least M out of N layers are to be measured, or monitored, and reselected according to the rules defined in existing specifications of absolute priority reselection. According to the existing rule, the wireless device 150 may search for and measure layers, provided that at least a signal strength or a signal quality of a camped on cell, or the serving cell 121, is below or equal to the respective thresholds, e.g., if the following condition is met: $Srxlev \leq S_{nonIntraSearchP}$ or $Squal \leq S_{nonIntraSearchQ}$.

The wireless device 150 may determine the M layers by one or more of the means described earlier e.g.: a rule that may be pre-defined, a pre-defined identifier, and a maximum M layers that may be pre-defined in the standard.

In some embodiments, the wireless device 150 may determine the remaining N−M layers. For the remaining N−M layers, these are only considered for measurement, or monitoring, and cell reselection during the higher priority search, which is performed when the serving cell 121 satisfies the condition that the signal strength and signal quality of the camped on cell, or serving cell 121, are above the respective thresholds. That is, e.g., if the following condition is met: $Srxlev > S_{nonIntraSearchP}$ and $Squal > S_{nonIntraSearchQ}$. In some embodiments, the remaining N−M layers are not considered for measurement and as reselection candidates when the signal strength or signal quality is below or equal their respective thresholds e.g. $Srxlev \leq S_{nonIntraSearchP}$ or $Squal \leq S_{nonIntraSearchQ}$. Hence, cell detection and measurement of the remaining N−M layers does not delay reselection to the first M layers, when the wireless device 150 needs to perform a reselection for coverage purposes.

The wireless device 150 may determine the N−M layers by one or more of the means similar to those described above. That is, e.g., in one example, a rule may be pre-defined, that the N−M layers, after the initial M layers in the neighbor cell list are to be measured, or monitored, and reselected only during the higher priority search.

In another example, each of the N−M layers is tagged with a pre-defined identifier by the network node, e.g., ID=1, indicating layers to be treated as "only during higher priority search", when corresponding conditions for the higher priority search are met.

In yet another example, the maximum N−M layers, e.g., 5 in E-UTRA and 2 in UTRA for inter-frequency, may be pre-defined in the standard. The network node 111 may use the first or the second approach described above to enable the wireless device 150 to uniquely determine the N−M layers.

Action 203a

The wireless device 150 may then proceed with the monitoring of layers for cell reselection. As explained above, which layers may be monitored by the wireless device 150 may depend on the carrier conditions in the serving cell 121.

In this action, the wireless device 150 monitors layers, of any priority, only out of the M layers when the one or more first signal measurements on the serving cell 121 of the wireless device 150 are below or equal to the first signal threshold, or when the one or more second signal measurements on the serving cell 121 are below or equal to the second signal threshold. That is, when the carrier conditions in the serving cell 121 are poor.

In some embodiments, to monitor, in reference to actions 203a and 203b, comprises one or more of: detecting a cell, measuring a cell and evaluating a cell for cell reselection.

In some embodiments, the wireless device 150 may monitor the M and the N−M layers after determining the layers as described in Action 202.

Action 203b

In this action, the wireless device 150 monitors layers with a priority higher than a priority of the serving layer out of the N layers when the one or more first signal measurements on the serving cell 121 are above the first signal threshold, and when the one or more second signal measurements on the serving cell 121 are above the second signal threshold. That is, when the carrier conditions in the serving cell 121 are poor.

In some embodiments, a non-limiting term 'monitoring' of a layer or to monitor a layer, in reference to actions 203a and 203b, is used and it refers to one or more plurality of radio measurements to be performed by the wireless device 150 on one or more cells on carrier frequencies or layers for the purpose of idle mode procedures, such as cell reselection procedures. Examples of measurements are cell detection, a.k.a. cell search or cell identification, measurements such as RSRP/RSRQ of a detected cell, comparison of signal strength and/or quality of a cell belonging to a layer with respective thresholds etc.

Action 204

The wireless device 150 may perform cell reselection, on the monitored layers, according to the detection and measurement requirements for absolute priority reselection when the one or more first signal measurements on the serving cell 121 of the wireless device 150 are below or equal to the first signal threshold, or when the one or more second signal measurements on the serving cell 121 are below or equal to the second signal threshold, and according to a higher priority search, when the one or more first signal measurements on the serving cell 121 are above the first signal threshold, and when the one or more second signal measurements on the serving cell 121 are above the second signal threshold. This is an optional action.

In some embodiments, the wireless device 150 may perform the cell reselection for the M and the N−M layers after having determined the layers as described in Action 202.

Action 205

In this action, the wireless device 150 may receive a configuration from the network node 111 operating in the wireless communications network 100 to adjust the obtained information based on the at least one of: the speed of the wireless device 150 and the state of the battery of the wireless device 150. For example, going at high speed or running low on battery, the network node 111 may determine that the wireless device 150 needs to change the number of layers monitored, or their identity. Further explanation of this is provided below under the heading "Examples of some criteria for determining parameters related to layers for cell reselection".

This is an optional action.

Action 206

In, this action, the wireless device 150 may adjust the obtained information based on at least one of: a speed of the wireless device 150 and a state of a battery of the wireless device 150, as explained above. This may be done, e.g., in response to the received configuration from the from the network node 111.

The wireless device 150 may also be allowed to autonomously adjust parameters M and N–M depending upon the speed. This may be allowed based on a pre-defined rule, or when permitted by the network, e.g., by network node 111, by a signaling message. For example, if the speed of the wireless device 150 is above a threshold, e.g., 50 km/hour or more, then the wireless device 150 may be allowed to reduce the number M by L. That is, effective layers M=M–L, where L may be pre-defined or signaled to the wireless device 150. The effective layers may be understood as the ones that may be used by the wireless device 150 for cell reselection evaluation i.e. for doing measurements and for performing cell reselection.

The wireless device 150 may also be allowed to autonomously adjust the values of M and N–M based on the state of its battery. The wireless device 150 may be allowed to do so based on a pre-defined rule or, when permitted by the network, e.g., the network node 111 by a signaling message. For example, if the wireless device 150 battery is below a threshold, then the wireless device 150 may be allowed to reduce the number M by L, i.e., effective layers M=M–L, where L may be pre-defined, or signaled to the wireless device 150. In this way, the battery of the wireless device 150 may be preserved for a longer time.

This is an optional action.

Figure 3:
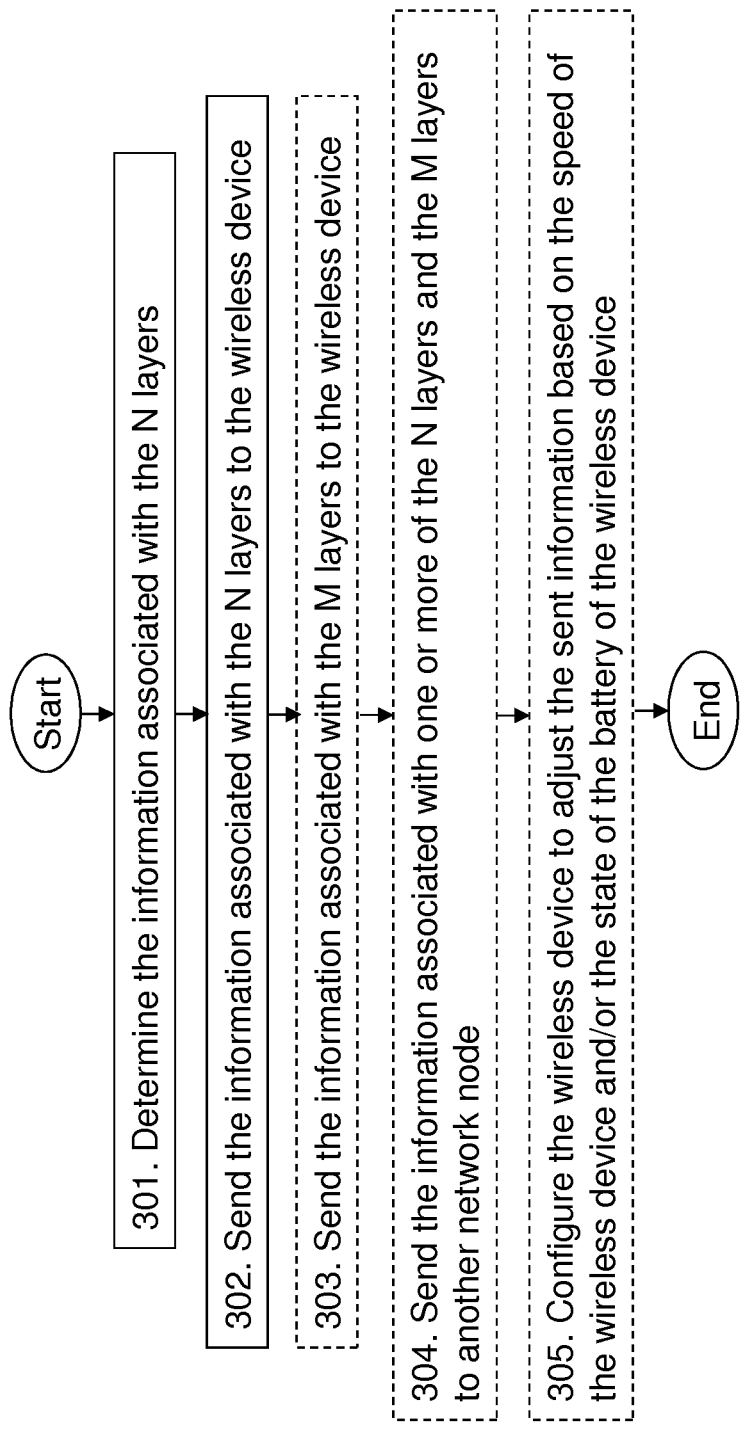
FIG. 3 is a flowchart illustrating embodiments of a method in a network node, according to some embodiments.

Embodiments of a method performed by the network node 111 for determining information for a wireless device 150 to perform cell reselection, will now be described with reference to the flowchart depicted depicted in FIG. 3. The network node 111 and the wireless device 150 operate in the wireless communications network 100, as stated earlier. FIG. 3 depicts a flowchart of the actions that are or may be performed by the network node 111 in embodiments herein. Discontinued lines depict optional actions.

The method may comprise the following actions, which actions may as well be carried out in another suitable order than that described below. In some embodiments, all the actions may be carried out, whereas in other embodiments only some action/s may be carried out.

As stated earlier, the embodiments herein are applicable to cell reselection procedure in any RRC state e.g. idle, idle mode, CELL_PCH, URA_PCH, CELL_FACH etc. . . .

Action 301

In this action, the network node 111 determines the information associated with the N layers, e.g., the list of N layers, which N layers may be used by the wireless device 150 for at least cell reselection. The information may be used by the wireless device 150 for at least cell reselection. The information comprises which M layers out of the N layers are to be used by the wireless device 150 for monitoring according to detection and measurement requirements for absolute priority reselection. Each layer of the N layers, and the serving layer of the wireless device 150 is assigned an absolute priority. The absolute priority reselection is performed when the one or more first signal measurements by the wireless device 150 on the serving cell 121 of the wireless device 150 are below or equal to the first signal threshold, e.g., the signal strength threshold, or when the one or more second signal measurements by the wireless device 150 on the serving cell 121 are below or equal to the second signal threshold, e.g., the signal quality threshold. The information also comprises which high priority layers out of the N layers are to be used by the wireless device 150 for monitoring only during a higher priority search, which is performed when the one or more first signal measurements on the serving cell 121 are above the first signal threshold, and when the one or more second signal measurements on the serving cell 121 are above the second signal threshold.

Each of the N layers may be assigned the priority with respect to a priority of the serving layer.

In some particular embodiments, the absolute priority reselection is performed when one or more signal strength measurements by the wireless device 150 on the serving cell 121 of the wireless device 150 are below or equal to the first signal threshold, or when one or more signal quality measurements by the wireless device 150 on the serving cell 121 are below or equal to the second signal threshold. In some particular embodiments, the information may comprise which high priority layers out of the N layers are to be used by the wireless device 150 for monitoring only during a higher priority search, which is performed when the one or more signal strength measurements on the serving cell 121 are above the first signal threshold, and when the one or more signal quality measurements on the serving cell 121 are above the second signal threshold.

In some embodiments, the information associated with the N layers comprising which M layers out of the N layers are to be used by the wireless device 150 for monitoring according to detection and measurement requirements for absolute priority reselection, comprises an indication that N–M layers are to be used for monitoring only when the one or more first signal measurements on the serving cell 121 are above the first signal threshold, and when the one or more second signal measurements on the serving cell 121 are above the second signal threshold.

In some of these embodiments, as stated earlier, the first signal threshold is the signal strength threshold and the second signal threshold is the signal quality threshold.

In some embodiments, monitoring comprises one or more of: detecting a cell, measuring a cell and evaluating a cell for cell reselection.

In some embodiments, the determining is based on one or more criteria, the criteria comprising: a DRX cycle length, a speed of the wireless device 150, one or more deployment aspects, and a battery life of the wireless device 150. This is explained below.

Examples of Some Criteria for Determining Parameters Related to Layers for Cell Reselection A few non-limiting examples of criteria which may be used by the network node 111, or even wireless device 150 in some cases, for determining or adjusting the parameters M and N–M are:

DRX cycle length: According to this criterion, the parameters M and N–M may be determined by the network node 111 depending upon the DRX cycle configured by the network node 111. The DRX cycle may typically be between 320 milliseconds (ms) to 2.56 seconds for the cell selection. The M layers may be monitored more often than N–M layers. Therefore, the monitoring of M layers may consume more battery power from the wireless device 150 compared to the monitoring of N–M layers. Thus, in a longer DRX cycle where power saving may be more critical, the network node 111 may set a smaller M and greater N–M. An example of a longer DRX cycle is 1.28 s. Examples of smaller M and greater N–M are 2 and 4 respectively.

Speed of the wireless device 150: According to this criterion, the parameters M and N–M may be determined by the network node 111 depending upon the speed of the wireless device 150. At higher speed, the network, e.g., the network node 111, may select fewer M carriers, since measurement delay may be shorter to avoid cell reselection failure. But at low speed, the network node 111 may select more M carriers, since the wireless device 150 may not need to reselect as quickly in low mobility cases. Examples of low, moderate and high wireless device 150 speeds are 3 km/hour, 3-50 km/hour and more than 50 km/hour. The speed of the wireless device 150 may be implicitly or explicitly determined by the network node 111. For example, the network node 111 may explicitly determine the speed based on uplink measurements, in case the wireless device 150 has transmitted previously. In another example, the network node 111 may determine the speed implicitly, based on radio environment or deployment scenario. Examples of radio environment or deployment scenarios are such as cells, e.g. the serving cell 121, serving wireless devices 150 in e.g., a high speed train, or cells along a motorway, where speed of the wireless device 150 may be high, or small or indoor cells, where speed is low.

Deployment aspects: According to this criterion, the parameters M and N–M may be determined by the network node 111 depending upon the deployment aspects. The deployment aspects may be characterized by, for example, coverage of cells on different carriers, e.g., whether cells on carrier are continuous or cells are in the form of hotspots, by cell size, e.g., cell radius, etc. . . . Carriers known to be necessary for coverage may need to be included in the M group, unless there are several coverage carriers, in which case some may also be configured to the N–M group.

Battery life of the wireless device 150: According to this criterion, the parameters M and N–M may be determined by the network node 111 depending upon the battery life of wireless device 150. In scenarios where battery life is quite critical, or if the network, e.g., the network node 111, is aware that the battery of the wireless device 150 is low, then the network, e.g., the network node 111 may use smaller M and larger N–M layers.

Combination of criteria: The network node 111 may also use any combination of criteria described above for more accurately determining the parameters M and N–M. For example, under low speed and longer DRX cycle, the network node 111 may use a larger value of M compared to the N–M layers. However, under low speed, longer DRX cycle and under low battery power of the wireless device 150, the network, e.g., the network node 111 may use a smaller M compared to the N–M layers, to ensure the battery of the wireless device 150 is retained for a longer time.

In some embodiments, at least one of the one or more first signal measurements and of the one or more second signal measurements is one of: one or more signal strength measurements and one or more signal quality measurements.

The network node 111 may use one or more criteria, described in section above under "Examples of some criteria for determining parameters related to layers for cell reselection", to determine:

a) Which M out of N layers are to be used by the wireless device 150 according to the rules for absolute priority reselection defined in existing specifications, which may be performed when the measurements on serving cell satisfies the condition that at least a signal strength or a signal quality of a camped on cell, or the serving cell 121, is below or equal to the respective thresholds, e.g., if the following condition is met: $Srxlev \leq S_{nonIntraSearchP}$ or $Squal \leq S_{nonIntraSearchQ}$; and b) Which of the remaining N–M layers are to be used by the wireless device 150 only during the higher priority search, which is performed when the measurements on serving cell satisfies the condition that the signal strength and signal quality of the camped on cell, or serving cell 121, are above the respective thresholds. That is, e.g., if the following condition is met: $Srxlev > S_{nonIntraSearchP}$ and $Squal > S_{nonIntraSearchQ}$.

Action 302

The network node 111 sends the information associated with the N layers, e.g., the list of N layers, to the wireless device 150, as further explained below.

Action 303

Although the information associated with the N layers comprises information on the M layers, as explained earlier, in this action, separately, the network node 111 may send the information associated with the M layers, e.g., the list of M layers, to the wireless device 150. This may be performed in case the value of M is not pre-defined, or in case the value of M is modified by the network node 111 e.g. due to change in the deployment scenario.

This is an optional action. Information on the M layers is already comprised in the information associated with the N layers.

In regards to Actions 302 and 303, the network node 111 may signal at least the information associated with the determined N and M layers to the wireless device 150. The network node 111 may signal this in a broadcast message or a dedicated message, enabling the wireless device 150 to perform low activity procedures. In order to allow the wireless device 150 to uniquely determine which rule for cell reselection is to be used for which layer, the signaled information may comprise of one or more of the following:

a) Frequency channel number, e.g., ARFCN, UARFCN, EARFCN etc. . . . , associated with each layer;

b) The M layers are the first or initial layers in the neighbor list according to a rule. Alternatively the rule may be that the M layers are the last ones in the neighbor list;

c) The M layers and the N–M layers are associated with different pre-defined identifiers, e.g., the M layers with ID #0, and remaining N–M layers with ID #1.

Action 304

The network node 111 may send the information associated with one or more of the N layers and the M layers, e.g., a list of one or more of the N layers and the M layers, to the another network node 112, which operates in the wireless communications network 100. Typically, the values of M and N that depend on the network deployment scenario, are the same in different network nodes in the same coverage areas. This action of sending information associated with one or more of the N layers and the M layers may therefore be performed to ensure that different network nodes in the same coverage areas are able to align these parameters i.e. N and M.

The network node 111 may also, optionally, signal the information associated with the determined N and M layers to the another network node 112, e.g., a neighboring eNode B over X2 interface, an O&M node, a OSS node, etc. . . . , which may use this for aligning similar parameters and/or for radio operations, e.g., tuning of parameters etc. . . . The information is the same as described in step 2 above.

Action 305

The network node 111 may configure the wireless device 150, that is, it may send a configuration message to the wireless device 150 to adjust the information associated with the N layers sent by the network node 111, based on at least one of: the speed of the wireless device 150 and the state of a battery of the wireless device 150, as explained above in regards to action 204. This is an optional action.

To perform the method actions described above in relation to FIG. 2 the wireless device 150 is configured to perform cell monitoring for cell reselection. The wireless device 150 may comprise the following arrangement depicted in FIG. 4. The wireless device 150 is adapted to operate in the wireless communications network 100. The detailed description of some of the following corresponds to the same references provided above, in relation to the actions described for the wireless device 150, and will thus not be repeated here.

The wireless device 150 comprises an obtaining circuit 401 configured to obtain information associated with the N layers, e.g., the list of N layers, which information may be used by the wireless device 150 for at least cell reselection, wherein the information comprises: which M layers out of the N layers are to be used by the wireless device 150 for monitoring according to detection and measurement requirements for absolute priority reselection, wherein each of the N layers, and the serving layer of the wireless device 150 is assigned an absolute priority. In some embodiments, the absolute priority reselection is configured to be performed when the one or more first signal measurements by the wireless device 150 on the serving cell 121 of the wireless device 150 are below or equal to the first signal threshold, or when the one or more second signal measurements by the wireless device 150 measured on the serving cell 121 are below or equal to the second signal threshold.

In some embodiments, the information associated with the N layers comprising which M layers out of the N layers are to be used by the wireless device 150 for monitoring according to detection and measurement requirements for absolute priority reselection, comprises an indication that N−M layers are to be used for monitoring only when the one or more first signal measurements on the serving cell 121 are above the first signal threshold, and when the one or more second signal measurements on the serving cell 121 are above the second signal threshold.

In some embodiments, each layer is related to a respective carrier frequency.

In some embodiments, to obtain the information associated with the N layers, e.g., the list of N layers, comprises to receive the information from the network node 111 adapted to operate in the wireless communications network 100.

In some embodiments, the obtaining circuit 401 is configured to obtain information associated with N layers, e.g., the list of N layers, autonomously by the wireless device 150, based on internal information in the wireless device 150.

In some embodiments, the obtaining circuit 401 is configured to obtain the information associated with N layers, based on pre-defined rules or pre-defined values.

In some embodiments, the information comprises at least one of: the pre-defined rule and the pre-defined identifier.

In some embodiments, the information further comprises at least one of: the absolute frequency number, the frequency channel number, and the absolute channel number.

In some embodiments, the information further comprises the index to the list of at least one of: absolute frequency numbers, frequency channel numbers or absolute channel numbers.

In some embodiments, the first signal threshold is the signal strength threshold and the second signal threshold is the signal quality threshold.

In some embodiments, at least one of the one or more first signal measurements and the one or more second signal measurements is the one of: one or more signal strength measurements and one or more signal quality measurements.

In some particular embodiments, the absolute priority reselection is configured to be performed when the one or more signal strength measurements by the wireless device 150 on the serving cell 121 of the wireless device 150 are below or equal to the first signal threshold, or when the one or more signal quality measurements by the wireless device 150 measured on the serving cell 121 are below or equal to the second signal threshold. In some of these embodiments, as stated earlier, the first signal threshold is the signal strength threshold and the second signal threshold is the signal quality threshold.

In some embodiments, to monitor comprises one or more of: detecting a cell, measuring a cell and evaluating a cell for cell reselection.

The wireless device 150 also comprises a monitoring circuit 402 configured to monitor layers, of any priority, only out of the M layers, when the one or more first signal measurements on the serving cell 121 of the wireless device 150 are below or equal to the first signal threshold, or when the one or more second signal measurements on the serving cell 121 are below or equal to the second signal threshold, and further configured to monitor layers with a priority higher than a priority of the serving layer out of the N layers, when the one or more first signal measurements on the serving cell 121 are above the first signal threshold, and when the one or more second signal measurements on the serving cell 121 are above the second signal threshold.

The wireless device 150 may comprise a determining circuit 403 configured to determine the M layers and/or the N layers based on the one of: the received information, internal information in the wireless device 150, and pre-defined values.

In some embodiments, the wireless device 150 may comprise a cell reselection circuit 404 configured to perform cell reselection, on the monitored layers, according to the detection and measurement requirements for absolute priority reselection when the one or more first signal measurements on the serving cell 121 of the wireless device 150 are below or equal to the first signal threshold, or when the one or more second signal measurements on the serving cell 121 are below or equal to the second signal threshold, and according to a higher priority search, when the one or more first signal measurements on the serving cell 121 are above the first signal threshold, and when the one or more second signal measurements on the serving cell 121 are above the second signal threshold.

In some embodiments, the wireless device 150 may comprise an adjusting circuit 405 configured to adjust the obtained information based on at least one of: a speed of the wireless device 150 and a state of a battery of the wireless device 150.

In some embodiments, the wireless device 150 may comprise an receiving circuit 406 configured to receive a configuration from the network node 111 adapted to operate in the wireless communications network 100, to adjust the obtained information based on the at least one of: the speed of the wireless device 150 and the state of the battery of the wireless device 150.

Figure 4:
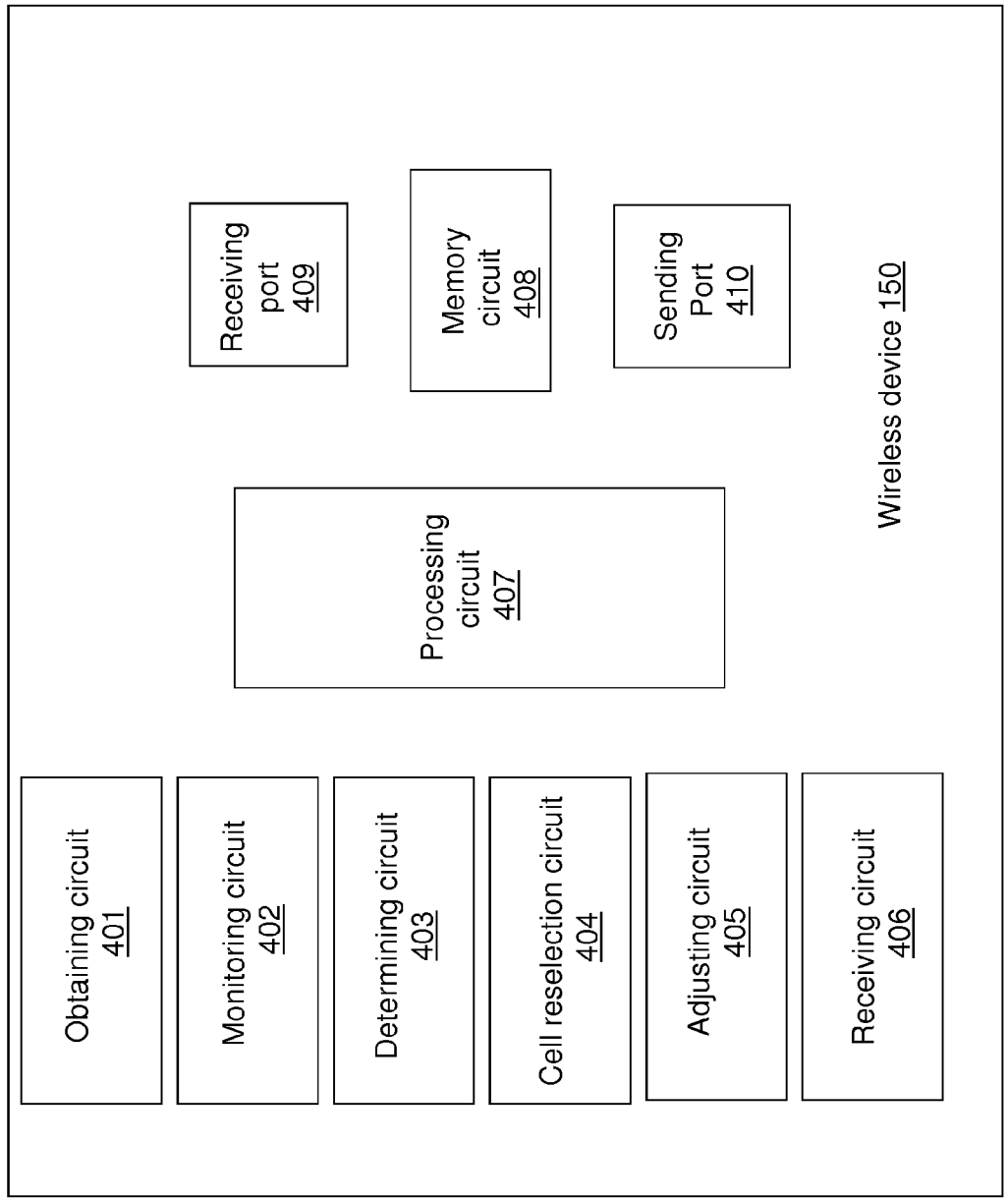
FIG. 4 is a block diagram of a wireless device that is configured according to some embodiments.

The embodiments herein for cell monitoring for cell reselection may be implemented through one or more processors, such as the processing circuit 407 in the wireless device 150 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the wireless device 150. One such carrier may be in the form of a CD ROM disc. It may be however feasible with other data carriers such as a memory stick. The computer program code may furthermore be provided as pure program code on a server and downloaded to the wireless device 150.

The wireless device 150 may further comprise a memory circuit 408 comprising one or more memory units. The memory circuit 408 may be arranged to be used to store data in relation to applications to perform the methods herein when being executed in the wireless device 150. The memory circuit 408 may be in communication with the processing circuit 407. Any of the other information processed by the processing circuit 407 may also be stored in the memory circuit 408.

In some embodiments, information may be received through a receiving port 409. In some embodiments, the receiving port 409 may be, for example, connected to the one or more antennas in the wireless device 150. In other embodiments, the wireless device 150 may receive information from another structure in the wireless communications network 100 through the receiving port 409. Since the receiving port 409 may be in communication with the processing circuit 407, the receiving port 409 may then send the received information to the processing circuit 407. The receiving port 409 may also be configured to receive other information.

The information processed by the processing circuit 407 in relation to the embodiments of the method herein may be stored in the memory circuit 408 which, as stated earlier, may be in communication with the processing circuit 407 and the receiving port 409.

The processing circuit 407 may be further configured to transmit or send information to the network node 111 or another node in the wireless communications network 100, through a sending port 410, which may be in communication with the processing circuit 407, and the memory circuit 408.

Those skilled in the art will also appreciate that the different circuits 401-406 described above may refer to a combination of analog and digital circuits, and/or one or more processors configured with software and/or firmware, e.g., stored in memory, that, when executed by the one or more processors such as the processing circuit 407, perform as described above, that is, perform actions as described above, in relation to FIG. 2. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the wireless device 150 are respectively implemented by means of a computer program product, comprising instructions, i.e., software code portions, which, when executed on at least one processor, cause the at least one processor to carry out the actions described herein, as performed by the wireless device 150. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 150. In some embodiments, the computer-readable storage medium may be a non-transitory computer-readable storage medium.

Also, in some embodiments, the different circuits 401-406 described above may be implemented as one or more applications running on one or more processors such as the processing circuit 407.

According to the foregoing, the disclosure herein describes the wireless device 150 for cell monitoring for cell reselection, the wireless device 150 being adapted to operate in the wireless communications network 100. The wireless device 150 comprises the processing circuit 407 and the memory circuit 408. Said memory circuit 408 comprises instructions executable by said processing circuit 407, whereby said wireless device 150 is operative to: a) obtain information associated with N layers, which information may be used by the wireless device 150 for at least cell reselection, wherein the information comprises which M layers out of the N layers are to be used by the wireless device 150 for monitoring according to detection and measurement requirements for absolute priority reselection, wherein each of the N layers, and the serving layer of the wireless device 150 is assigned an absolute priority; and b) monitor layers, of any priority, only out of the M layers, when the one or more first signal measurements on the serving cell 121 of the wireless device 150 are below or equal to the first signal threshold, or when the one or more second signal measurements on the serving cell 121 are below or equal to the second signal threshold, and further to monitor layers with a priority higher than the priority of the serving layer out of the N layers, when the one or more first signal measurements on the serving cell 121 are above the first signal threshold, and when the one or more second signal measurements on the serving cell 121 are above the second signal threshold.

To perform the method actions described above in relation to FIG. 3, the network node 111 is adapted to determine information for the wireless device 150 to perform cell reselection. The network node 111 may comprise the following arrangement depicted in FIG. 5. The network node 111 and the wireless device 150 are adapted to operate in the wireless communications network 100. The detailed description of some of the following corresponds to the same references provided above, in relation to the actions described for the network node 111, and will thus not be repeated here.

The network node 111 comprises a determining circuit 501 configured to determine information associated with the N layers, e.g., the list of N layers, for a wireless device 150 adapted to operate in the wireless communications network 100, which N layers may be used by the wireless device 150 to perform at least cell reselection. The information may be used by the wireless device 150 for at least cell reselection. The information comprises:

which M layers out of the N layers are to be used by the wireless device 150 for monitoring according to detection and measurement requirements for absolute priority reselection, wherein each layer of the N layers, and the serving layer of the wireless device 150 is assigned an absolute priority, and wherein the absolute priority reselection, wherein layers, of any priority, only out of the M layers are monitored by the wireless device 150, is configured to be performed when the one or more first signal measurements by the wireless device 150 on the serving cell 121 of the wireless device 150 are below or equal to the first signal threshold, or when the one or more second signal measurements by the wireless device 150 on the serving cell 121 are below or equal to the second signal threshold; and which high priority layers out of the N layers are to be used by the wireless device 150 for monitoring only during a higher priority search, which is configured to be performed when the one or more first signal measurements on the serving cell 121 are above the first signal threshold, and when the one or more second signal measurements on the serving cell 121 are above the second signal threshold.

Each layer may be assigned the priority with respect to a priority of the serving layer.

In some embodiments, the information associated with the N layers comprising which M layers out of the N layers are to be used by the wireless device 150 for monitoring according to detection and measurement requirements for absolute priority reselection, comprises an indication that N−M layers are to be used for monitoring only when the one or more first signal measurements on the serving cell 121 are above the first signal threshold, and when the one or more second signal measurements on the serving cell 121 are above the second signal threshold.

In some embodiments, to monitor comprises one or more of: to detect a cell, to measure a cell and to evaluate a cell for cell reselection.

In some embodiments, to determine is based on one or more criteria, the criteria comprising: the DRX cycle length, the speed of the wireless device 150, the one or more deployment aspects, or the battery life of the wireless device 150.

In some embodiments, at least one of the one or more first signal measurements and of the one or more second signal measurements is one of: one or more signal strength measurements and one or more signal quality measurements.

In some particular embodiments, the absolute priority reselection is configured to be performed when the one or more signal strength measurements by the wireless device 150 on the serving cell 121 of the wireless device 150 are below or equal to the first signal threshold, or when the one or more signal quality measurements by the wireless device 150 on the serving cell 121 are below or equal to the second signal threshold. In some particular embodiments, the information may comprise which high priority layers out of the N layers are to be used by the wireless device 150 for monitoring only during a higher priority search, which is performed when the one or more signal strength measurements on the serving cell 121 are above the first signal threshold, and when the one or more signal quality measurements on the serving cell 121 are above the second signal threshold.

In some of these embodiments, as stated earlier, the first signal threshold is the signal strength threshold and the second signal threshold is the signal quality threshold.

The network node 111 also comprises a sending circuit 502 configured to send the information associated with the N layers, e.g., a list of N layers, to the wireless device 150.

In some embodiments, the sending circuit 502 is further configured to send information associated with the M layers, e.g., a list of the M layers, to the wireless device 150.

In some embodiments, the sending circuit 502 is further configured to send information associated with one or more of the N layers and the M layers, e.g., a list of one or more of the N layers and the M layers, to the another network node 112 adapted to operate in the wireless communications network.

In some embodiments, the network node 111 may also comprise a configuring circuit 503 configured to configure, that is, to send a configuration message to the wireless device 150 to adjust the information associated with the N layers sent by the network node 111, based on at least one of: a speed of the wireless device 150 and a state of a battery of the wireless device 150.

Figure 5:
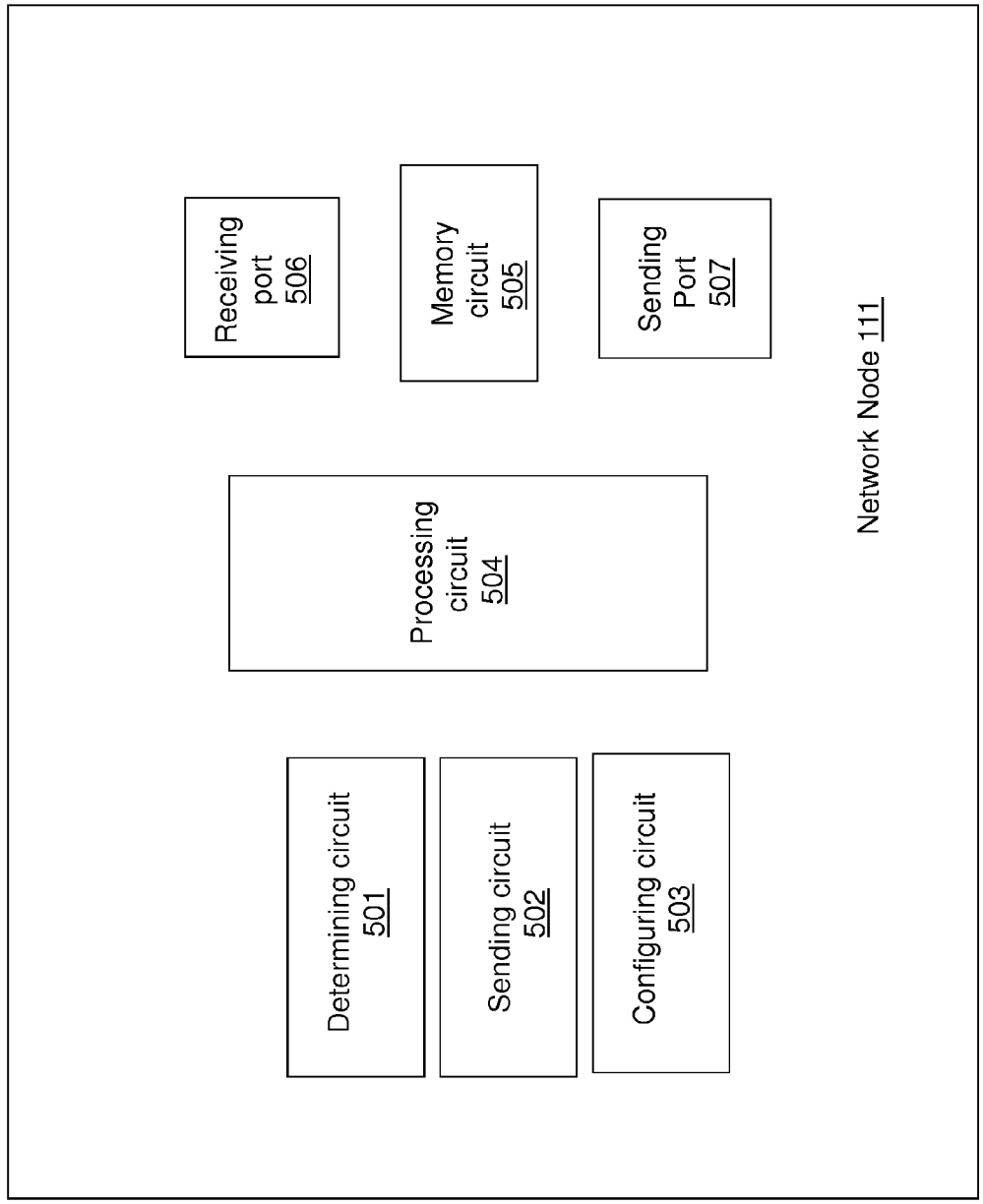
FIG. 5 is a block diagram of a network node that is configured according to some embodiments.

The embodiments herein for determining information for a wireless device 150 to perform cell reselection may be implemented through one or more processors, such as the processing circuit 504 in the network node 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 111. One such carrier may be in the form of a CD ROM disc. It may be however feasible with other data carriers such as a memory stick. The computer program code may furthermore be provided as pure program code on a server and downloaded to the network node 111.

The network node 111 may further comprise a memory circuit 505 comprising one or more memory units. The memory circuit 505 may be arranged to be used to store data in relation to applications to perform the methods herein when being executed in the network node 111. The memory circuit 505 may be in communication with the processing circuit 504. Any of the other information processed by the processing circuit 504 may also be stored in the memory circuit 505.

In some embodiments, information may be received through a receiving port 506. In some embodiments, the receiving port 506 may be, for example, connected to the one or more antennas in the network node 111. In other embodiments, the network node 111 may receive information from another structure in the wireless communications network 100 through the receiving port 506. Since the receiving port 506 may be in communication with the processing circuit 504, the receiving port 506 may then send the received information to the processing circuit 504. The receiving port 506 may also be configured to receive other information.

The information processed by the processing circuit 504 in relation to the embodiments of method herein may be stored in the memory circuit 505 which, as stated earlier, may be in communication with the processing circuit 504 and the receiving port 506.

The processing circuit 504 may be further configured to transmit or send information to the wireless device 150 or to the another network node 112, through a sending port 507, which may be in communication with the processing circuit 504, and the memory circuit 505.

Those skilled in the art will also appreciate that the different circuits 501-503 described above may refer to a combination of analog and digital circuits, and/or one or more processors configured with software and/or firmware, e.g., stored in memory, that, when executed by the one or more processors such as the processing circuit 504, perform as described above, that is, perform actions as described above, in relation to FIG. 3. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the methods according to the embodiments described herein for the network node 111 are respectively implemented by means of a computer program product, comprising instructions, i.e., software code portions, which, when executed on at least one processor, cause the at least one processor to carry out the actions described herein, as performed by the network node 111. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 111. In some embodiments, the computer-readable storage medium may be a non-transitory computer-readable storage medium.

Also, in some embodiments, the different circuits 501-503 described above may be implemented as one or more applications running on one or more processors such as the processing circuit 504.

According to the foregoing, the disclosure herein describes the network node 111 for determining information for the wireless device 150 to perform cell reselection, the network node 111 and the wireless device 150 being adapted to operate in the wireless communications network 100, the network node 111 comprising the processing circuit 504 and the memory circuit 505, said memory circuit 505 comprising instructions executable by said processing circuit 504, whereby said network node 111 is operative to: a) determine information associated with N layers, which information may be used by the wireless device 150 to perform at least cell reselection, wherein the information comprises: a.1) which M layers out of the N layers are to be used by the wireless device 150 for monitoring according to detection and measurement requirements for absolute priority reselection, wherein each layer of the N layers, and a serving layer of the wireless device 150 is assigned an absolute priority, and wherein the absolute priority reselection, wherein layers, of any priority, only out of the M layers are monitored by the wireless device 150, is configured to be performed when one or more first signal measurements by the wireless device 150 on a serving cell 121 of the wireless device 150 are below or equal to a first signal threshold, or when one or more second signal measurements by the wireless device 150 on the serving cell 121 are below or equal to a second signal threshold; and a.2) which high priority layers out of the N layers are to be used by the wireless device 150 for monitoring only during a higher priority search, which is configured to be performed when the one or more first signal measurements on the serving cell 121 are above the first signal threshold, and when the one or more second signal measurements on the serving cell 121 are above the second signal threshold; and b) send the information associated with the N layers, to the wireless device 150.

Further Description and Embodiments Relating to and Combinable with any of the Suitable Embodiments Above The embodiments herein are applicable to cell reselection procedure in any RRC state e.g. idle, idle mode, CELL_PCH, URA_PCH, CELL_FACH etc.

Some embodiments herein relate to measurements of additional higher priority carriers in idle states.

Embodiments herein may comprise the following: a) Method in a wireless device 150 of adapting a cell reselection procedure accounting layers for monitoring; and/or b) Method in a network node 111 of determining and signaling parameters related to layers for enabling cell reselection.

These embodiments are elaborated below:

Method in the Wireless Device 150 of Adapting a Cell Reselection Procedure

A network node, such as network node 111, managing or assisting the cell reselection of one or a plurality of wireless devices 150, may create a neighbor list, or any measurement control message, which contains at least a plurality of layers. The message may be signaled to the wireless device 150, typically, in a broadcast message as part of system information, e.g., in one or more system information blocks (SIBs). The message may also be signaled to the wireless device 150 in a dedicated message or any wireless device 150 specific message, i.e., UE specific message, e.g., in one or more system information blocks (SIBs) sent on a dedicated channel such as Physical Downlink Shared CHannel (PDSCH) in E-UTRA or High Speed Downlink Shared Channel (HS-DSCH) in UTRA. The wireless device 150 may use the received information for idle mode procedures or for procedures in other low activity states, e.g., for monitoring one or a plurality of layers, and for performing cell reselection. The rules disclosed herein may be applicable for inter-frequency cell reselection, inter-RAT cell reselection, or inter-RAT cell reselection for only certain RAT, e.g., only E-UTRA to UTRA or UTRA to E-UTRA. The rules may be pre-defined in a standard and may be applied by the wireless device 150 when performing the cell reselection. The set of rules are described below:

The neighbour list containing at least information about the layers, up to N, may be divided into two parts: M layers and N–M layers. The information about the layers may be absolute frequency number or absolute frequency channel number, or simply absolute channel number. Examples of absolute frequency number are ARFCN, UARFCN, EARFCN etc. The steps performed in the wireless device 150 may be as follows:

1. In regards to Action 201 described above, the wireless device 150 may receive at least a list of N layers for monitoring and cell reselection from the network node 111. The maximum value of N layers may be specified in the standard, e.g., N≤4 for UTRA and N≤8 for E-UTRA for inter-frequency reselection, or N≤8 for UTRA and N≤12 for E-UTRA for inter-frequency and inter-RAT cell reselection.

2. In regards to Action 202, the wireless device 150 may determine that at least M out of N layers are to be measured, or monitored, and reselected according to the rules defined in existing specifications of absolute priority reselection. According to the existing rule, the wireless device 150 may search for and measure layers, provided that at least a signal strength or a signal quality of a camped on cell, or the serving cell 121, is below or equal to the respective thresholds, e.g., if the following condition is met: Srxlev≤$S_{nonIntraSearchP}$ or Squal≤$S_{nonIntraSearchQ}$.

The wireless device 150 may determine the M layers by one or more of the following means e.g.:

In one example, a rule may be pre-defined that, if there are N layers in the neighbor cell list, the first M layers indicated in the list are measured, or monitored, and reselected, according to the rule defined in existing specifications of absolute priority reselection. Alternatively, any other rule that uniquely identifies M layers from the list may be used, for example, the last M layers in the list. The network node 111, when sending the list of N layers may therefore also comply with this rule to ensure that the wireless device 150 receives correct information about the M layers.

In another example, each of the M layers is tagged with a pre-defined identifier by the network node 111, e.g. ID=0 indicating layers to be treated as normal layers, i.e. to be measured, or monitored, and reselected according to the rule defined in existing specifications.

In yet another example, a maximum M layers, e.g., 3 in E-UTRA and 2 in UTRA for inter-frequency, may be pre-defined in the standard. The network node 111 may use the first or second approach described above to enable the wireless device 150 to uniquely determine the M layers. In case the network node 111 sends M+K layers which are more than the pre-defined number, then the wireless device 150 may use only the initial M layers in the list, or any of the M layers in the list for measured, or monitored, and reselected according to the rule defined in existing specifications of absolute priority reselection. It may also be pre-defined that the wireless device 150 measures them, i.e., K layers, and uses them for reselection during the higher priority search, i.e., rule described in step 3 below.

3. Also in regards to Action 202, the wireless device 150 may determine the remaining N–M layers. For the remaining N–M layers, these are only considered for measurement, or monitoring, and cell reselection during the higher priority search, which is performed when the serving cell 121 satisfies the condition that the signal strength and signal quality of the camped on cell, or serving cell 121, are above the respective thresholds. That is, e.g., if the following condition is met: Srxlev>$S_{nonIntraSearchP}$ and Squal>$S_{nonIntraSearchQ}$. In some embodiments, the remaining N–M layers are not considered for measurement and as reselection candidates when the signal strength or signal quality is below or equal their respective thresholds e.g. Srxlev≤$S_{nonIntraSearchP}$ or Squal≤$S_{nonIntraSearchQ}$. Hence, cell detection and measurement of the remaining N–M layers does not delay reselection to the first M layers, when the wireless device 150 needs to perform a reselection for coverage purposes.

The wireless device 150 may determine the N–M layers by one or more of the means similar to those described under step 2. That is, e.g., in one example, a rule may be pre-defined, that the N–M layers, after the initial M layers in the neighbor cell list are to be measured, or monitored, and reselected only during the higher priority search.

In another example, each of the N–M layers is tagged with a pre-defined identifier by the network node, e.g., ID=1, indicating layers to be treated as "only during higher priority search", when corresponding conditions for the higher priority search are met.

In yet another example, the maximum N–M layers, e.g., 5 in E-UTRA and 2 in UTRA for inter-frequency, may be pre-defined in the standard. The network node 111 may use the first or the second approach described above to enable the wireless device 150 to uniquely determine the N–M layers.

4. In regards to Actions 203a, 203b and 204, after determining the layers as described in the previous steps, the wireless device 150 may monitor and perform the cell reselection for the M and the N–M layers according to the rules described in step 3 and step 4 respectively.

Method in the Network Node 111 of Determining and Signaling Parameters Related to Layers for Cell Reselection The steps performed by network node 111, e.g., eNode B, Radio Network Controller (RNC), Base station Controller (BSC), etc. . . . , for controlling or managing the operation of the wireless device 150, e.g., monitoring of layers and cell reselection, in low activity states, e.g., idle mode, URA/CELL_PCH states etc. . . . , may comprise the following.

1. In regards to Action 301, the network node 111 may use one or more criteria, described in section above under "Examples of some criteria for determining parameters related to layers for cell reselection", to determine:

a) Which M out of N layers are to be used by the wireless device 150 according to the rules for absolute priority reselection defined in existing specifications, which is performed when the measurements on serving cell satisfies the condition as described in step 2 of the section entitled "Method in the wireless device 150 of adapting a cell reselection procedure" and;

b) Which of the remaining N–M layers are to be used by the wireless device 150 only during the higher priority search, which is performed when the measurements on serving cell satisfies the condition as described in step 3 of the section above entitled "Method in the wireless device 150 of adapting a cell reselection procedure".

2. In regards to Actions 302 and 303, the network node may signal at least the information associated with the determined N and M layers to the wireless device 150. The network node 111 may signal this in a broadcast message or a dedicated message, enabling the wireless device 150 to perform low activity procedures. In order to allow the wireless device 150 to uniquely determine which rule for cell reselection is to be used for which layer, the signaled information may comprise of one or more of the following:

a) Frequency channel number, e.g., ARFCN, UARFCN, EARFCN etc. . . . , associated with each layer;

b) The M layers are the first or initial layers in the neighbor list according to a rule. Alternatively the rule may be that the M layers are the last ones in the neighbor list;

c) The M layers and the N–M layers are associated with different pre-defined identifiers, e.g., the M layers with ID #0, and remaining N–M layers with ID #1.

3. In regards to Action 304, the network node 111 may also, optionally, signal the information associated with the determined N and M layers to the another network node 112, e.g., a neighboring eNode B over X2 interface, an O&M node, a OSS node, etc. . . . , which may use this for aligning similar parameters and/or for radio operations, e.g., tuning of parameters etc. . . . . The information is the same as described in step 2 above.

An advantage of the embodiments herein may be that mobile operators may include additional layers in the neighbor list to facilitate wireless devices 150 which are in good coverage to perform reselections for load balancing or offload purposes. Wireless devices 150 in good coverage may search for these additional layers. For wireless devices 150 in poor coverage, according to embodiments herein, the additional layers provided for load balancing or offload purposes may not increase the reselection delay, and may also not increase the power consumption of the wireless device 150, because the additional layers may not need to be searched for or measured.

Another advantage may be that the operators who have larger spectrum holding may effectively and efficiently utilize their spectrum for mobile communications. This is because larger spectrum means larger number of carriers available to the operators. If all or several of these carriers are used according to existing cell reselection principles, then cell reselection will become unnecessary longer. However the disclosed method reduces the cell reselection delay for at least certain number of carriers.

Yet another advantage is that the mobility performance for at least certain minimum number of layers, i.e., M layers, is not degraded even though the total number of layers N for monitoring may be increased to a larger number. This is because the minimum number of layers, M, may be measured at much faster rate compared to the remaining N−M layers.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a wireless device of cell monitoring for cell reselection, the wireless device operating in a wireless communications network, the method comprising:
    obtaining information associated with N layers, which information may be used by the wireless device for at least cell reselection, wherein the information comprises which M layers out of the N layers are to be used by the wireless device for monitoring according to detection and measurement requirements for absolute priority reselection, wherein each of the N layers, and a serving layer of the wireless device is assigned an absolute priority; and
    monitoring layers, of any priority, only out of the M layers, when one or more first signal measurements on a serving cell of the wireless device are below or equal to a first signal threshold, or when one or more second signal measurements on the serving cell are below or equal to a second signal threshold, and
    monitoring layers with a priority higher than a priority of the serving layer out of the N layers when the one or more first signal measurements on the serving cell are above the first signal threshold, and when the one or more second signal measurements on the serving cell are above the second signal threshold.

2. The method of claim 1, wherein the information associated with the N layers comprising which M layers out of the N layers are to be used by the wireless device for monitoring according to detection and measurement requirements for absolute priority reselection, comprises an indication that N-M layers are to be used for monitoring only when the one or more first signal measurements on the serving cell are above the first signal threshold, and when the one or more second signal measurements on the serving cell are above the second signal threshold.

3. The method of claim 1, wherein each layer is related to a respective carrier frequency.

4. The method of claim 1, wherein the obtaining the information associated with the N layers, comprises receiving the information from a network node operating in the wireless communications network.

5. The method of claim 1, wherein the obtaining the information associated with the N layers, is performed autonomously by the wireless device, based on internal information in the wireless device.

6. The method of claim 1, wherein the obtaining the information associated with the N layers, is performed based on pre-defined rules or pre-defined values.

7. The method of claim 1, further comprising:
    performing cell reselection, on the monitored layers,
        according to the detection and measurement requirements for absolute priority reselection when the one or more first signal measurements on the serving cell of the wireless device are below or equal to the first signal threshold, or when the one or more second signal measurements on the serving cell are below or equal to the second signal threshold, and
        according to a higher priority search, when the one or more first signal measurements on the serving cell are above the first signal threshold, and when the one or more second signal measurements on the serving cell are above the second signal threshold.

8. The method of claim 1, further comprising adjusting the obtained information based on at least one of: a speed of the wireless device and a state of a battery of the wireless device.

9. The method of claim 8, further comprising receiving a configuration from a network node operating in the wireless communications network to adjust the obtained information based on the at least one of: the speed of the wireless device and the state of the battery of the wireless device.

10. The method of claim 1, wherein the first signal threshold is a signal strength threshold and the second signal threshold is a signal quality threshold.

11. The method of claim 1, wherein at least one of: the one or more first signal measurements and the one or more second signal measurements is one of: one or more signal strength measurements and one or more signal quality measurements.

12. The method of claim 1, wherein the monitoring comprises one or more of: detecting a cell, measuring a cell and evaluating a cell for cell reselection.

13. A non-transitory computer readable medium storing software instructions executable by at least one processor of a wireless device, whereby the wireless device is operative to:
    obtain information associated with N layers, which information may be used by the wireless device for at least cell reselection, wherein the information comprises which M layers out of the N layers are to be used by the wireless device for monitoring according to detection and measurement requirements for absolute priority reselection, wherein each of the N layers, and a serving layer of the wireless device is assigned an absolute priority; and
    monitoring layers, of any priority, only out of the M layers, when one or more first signal measurements on a serving cell of the wireless device are below or equal to a first signal threshold, or when one or more second signal measurements on the serving cell are below or equal to a second signal threshold, and
    monitoring layers with a priority higher than a priority of the serving layer out of the N layers when the one or more first signal measurements on the serving cell are above the first signal threshold, and when the one or more second signal measurements on the serving cell are above the second signal threshold.

14. A method performed by a network node for determining information for a wireless device to perform cell reselection, the network node and the wireless device operating in a wireless communications network, the method comprising:

determining information associated with N layers, which information may be used by the wireless device for at least cell reselection, wherein the information comprises:

which M layers out of the N layers are to be used by the wireless device for monitoring according to detection and measurement requirements for absolute priority reselection, wherein each of the N layers, and a serving layer of the wireless device is assigned an absolute priority, and wherein the absolute priority reselection, wherein layers, of any priority, only out of the M layers are monitored by the wireless device, is performed when one or more first signal measurements by the wireless device on a serving cell of the wireless device are below or equal to a first signal threshold, or when one or more second signal measurements by the wireless device on the serving cell are below or equal to a second signal threshold; and which high priority layers out of the N layers are to be used by the wireless device for monitoring only during a higher priority search, which is performed when the one or more first signal measurements on the serving cell are above the first signal threshold, and when the one or more second signal measurements on the serving cell are above the second signal threshold, and sending the information associated with the N layers, to the wireless device.

15. The method of claim 14, wherein the information associated with the N layers comprising which M layers out of the N layers are to be used by the wireless device for monitoring according to detection and measurement requirements for absolute priority reselection, comprises an indication that N−M layers are to be used for monitoring only when the one or more first signal measurements on the serving cell are above the first signal threshold, and when the one or more second signal measurements on the serving cell are above the second signal threshold.

16. The method of claim 14, wherein monitoring comprises one or more of: detecting a cell, measuring a cell and evaluating a cell for cell reselection.

17. The method of claim 16, further comprising sending a configuration message to the wireless device to adjust the information associated with the N layers sent by the network node based on at least one of: a speed of the wireless device and a state of a battery of the wireless device.

18. The method of claim 14, further comprising sending information associated with the M layers to the wireless device.

19. The method of claim 18, further comprising sending the information associated with one or more of the N layers and the M layers, to another network node operating in the wireless communications network.

20. The method of claim 14, wherein at least one of the one or more first signal measurements and of the one or more second signal measurements is one of: one or more signal strength measurements and one or more signal quality measurements.

21. A non-transitory computer readable medium storing software instructions executable by at least one processor of a network node, whereby the network node is operative to:

determine information associated with N layers, which information may be used by a wireless device for at least cell reselection, wherein the information comprises:

which M layers out of the N layers are to be used by the wireless device for monitoring according to detection and measurement requirements for absolute priority reselection, wherein each of the N layers, and a serving layer of the wireless device is assigned an absolute priority, and wherein the absolute priority reselection, wherein layers, of any priority, only out of the M layers are monitored by the wireless device, is performed when one or more first signal measurements by the wireless device on a serving cell of the wireless device are below or equal to a first signal threshold, or when one or more second signal measurements by the wireless device on the serving cell are below or equal to a second signal threshold; and which high priority layers out of the N layers are to be used by the wireless device for monitoring only during a higher priority search, which is performed when the one or more first signal measurements on the serving cell are above the first signal threshold, and when the one or more second signal measurements on the serving cell are above the second signal threshold, and send the information associated with the N layers, to the wireless device.

22. A wireless device configured to perform cell monitoring for cell reselection, the wireless device being adapted to operate in a wireless communications network, the wireless device comprising:

an obtaining circuit configured to obtain information associated with N layers, which information may be used by the wireless device for at least cell reselection, wherein the information comprises which M layers out of the N layers are to be used by the wireless device for monitoring according to detection and measurement requirements for absolute priority reselection, wherein each of the N layers, and a serving layer of the wireless device is assigned an absolute priority; and a monitoring circuit configured to monitor layers, of any priority, only out of the M layers, when one or more first signal measurements on a serving cell of the wireless device are below or equal to a first signal threshold, or when one or more second signal measurements on the serving cell are below or equal to a second signal threshold, and further configured to monitor layers with a priority higher than a priority of the serving layer out of the N layers, when the one or more first signal measurements on the serving cell are above the first signal threshold, and when the one or more second signal measurements on the serving cell are above the second signal threshold.

23. The wireless device of claim 22, wherein the information associated with the N layers comprising which M layers out of the N layers are to be used by the wireless device for monitoring according to detection and measurement requirements for absolute priority reselection, comprises an indication that N−M layers are to be used for monitoring only when the one or more first signal measurements on the serving cell are above the first signal threshold, and when the one or more second signal measurements on the serving cell are above the second signal threshold.

24. The wireless device of claim 22, wherein each layer is related to a respective carrier frequency.

25. The wireless device of claim 22, wherein to obtain information associated with N layers, comprises to receive the information from a network node adapted to operate in the wireless communications network.

26. The wireless device of claim 22, wherein the obtaining circuit is configured to obtain information associated with N layers, autonomously by the wireless device, based on internal information in the wireless device.

27. The wireless device of claim 22, wherein the obtaining circuit is configured to obtain the information associated with the N layers, based on pre-defined rules or pre-defined values.

28. The wireless device of claim 22, further comprising:
a cell reselection circuit configured to perform cell reselection, on the monitored layers,
according to the detection and measurement requirements for absolute priority reselection when the one or more first signal measurements on the serving cell of the wireless device are below or equal to the first signal threshold, or when the one or more second signal measurements on the serving cell are below or equal to the second signal threshold, and
according to a higher priority search, when the one or more first signal measurements on the serving cell are above the first signal threshold, and when the one or more second signal measurements on the serving cell are above the second signal threshold.

29. The wireless device of claim 22, further comprising an adjusting circuit configured to adjust the obtained information based on at least one of: a speed of the wireless device and a state of a battery of the wireless device.

30. The wireless device of claim 29, further comprising a receiving circuit configured to receive a configuration from a network node adapted to operate in the wireless communications network, to adjust the obtained information based on the at least one of: the speed of the wireless device and the state of the battery of the wireless device.

31. The wireless device of claim 22, wherein the first signal threshold is a signal strength threshold and the second signal threshold is a signal quality threshold.

32. The wireless device of claim 22, wherein at least one of the one or more first signal measurements and the one or more second signal measurements is one of: one or more signal strength measurements and one or more signal quality measurements.

33. The wireless device of claim 24, wherein to monitor comprises one or more of: detecting a cell, measuring a cell and evaluating a cell for cell reselection.

34. A network node adapted to determine information for a wireless device to perform cell reselection, the network node and the wireless device being adapted to operate in a wireless communications network, the network node comprising:
a determining circuit configured to determine information associated with N layers, which information may be used by the wireless device to perform at least cell reselection, wherein the information comprises:
which M layers out of the N layers are to be used by the wireless device for monitoring according to detection and measurement requirements for absolute priority reselection, wherein each layer of the N layers, and a serving layer of the wireless device is assigned an absolute priority, and wherein the absolute priority reselection, wherein layers, of any priority, only out of the M layers are monitored by the wireless device, is configured to be performed when one or more first signal measurements by the wireless device on a serving cell of the wireless device are below or equal to a first signal threshold, or when one or more second signal measurements by the wireless device on the serving cell are below or equal to a second signal threshold; and
which high priority layers out of the N layers are to be used by the wireless device for monitoring only during a higher priority search, which is configured to be performed when the one or more first signal measurements on the serving cell are above the first signal threshold, and when the one or more second signal measurements on the serving cell are above the second signal threshold, and
a sending circuit configured to send the information associated with the N layers, to the wireless device.

35. The network node of claim 34, wherein the information associated with the N layers comprising which M layers out of the N layers are to be used by the wireless device for monitoring according to detection and measurement requirements for absolute priority reselection, comprises an indication that N−M layers are to be used for monitoring only when the one or more first signal measurements on the serving cell are above the first signal threshold, and when the one or more second signal measurements on the serving cell are above the second signal threshold.

36. The network node of claim 34, wherein to monitor comprises one or more of: to detect a cell, to measure a cell and to evaluate a cell for cell reselection.

37. The network node of claim 36, further comprising a configuring circuit configured to send a configuration message to the wireless device to adjust the information associated with the N layers sent by the network node, based on at least one of: a speed of the wireless device and a state of a battery of the wireless device.

38. The network node of claim 34, wherein the sending circuit is further configured to send information associated with the M layers to the wireless device.

39. The network node of claim 38, further comprising a sending circuit configured to send information associated with one or more of the N layers and the M layers to another network node 112 adapted to operate in the wireless communications network.

40. The network node of claim 34, wherein at least one of the one or more first signal measurements and of the one or more second signal measurements is one of: one or more signal strength measurements and one or more signal quality measurements.

41. A wireless device for cell monitoring for cell reselection, the wireless device being adapted to operate in a wireless communications network, the wireless device comprising a processing circuit and a memory circuit, said memory circuit comprising instructions executable by said processing circuit, whereby said wireless device is operative to:
obtain information associated with N layers, which information may be used by the wireless device for at least cell reselection, wherein the information comprises which M layers out of the N layers are to be used by the wireless device for monitoring according to detection and measurement requirements for absolute priority reselection, wherein each of the N layers, and a serving layer of the wireless device is assigned an absolute priority; and
monitor layers, of any priority, only out of the M layers, when one or more first signal measurements on a serving cell of the wireless device are below or equal to a first signal threshold, or when one or more second signal measurements on the serving cell are below or equal to a second signal threshold, and further to monitor layers with a priority higher than a priority of the serving layer out of the N layers, when the one or more first signal measurements on the serving cell are above the first signal threshold, and when the one or more second signal measurements on the serving cell are above the second signal threshold.

42. A network node for determining information for a wireless device to perform cell reselection, the network node and the wireless device being adapted to operate in a wireless communications network, the network node comprising a processing circuit and a memory circuit, said memory circuit comprising instructions executable by said processing circuit, whereby said network node is operative to:
  determine information associated with N layers, which information may be used by the wireless device to perform at least cell reselection, wherein the information comprises:
    which M layers out of the N layers are to be used by the wireless device for monitoring according to detection and measurement requirements for absolute priority reselection, wherein each layer of the N layers, and a serving layer of the wireless device is assigned an absolute priority, and wherein the absolute priority reselection, wherein layers, of any priority, only out of the M layers are monitored by the wireless device, is configured to be performed when one or more first signal measurements by the wireless device on a serving cell of the wireless device are below or equal to a first signal threshold, or when one or more second signal measurements by the wireless device on the serving cell are below or equal to a second signal threshold; and
    which high priority layers out of the N layers are to be used by the wireless device for monitoring only during a higher priority search, which is configured to be performed when the one or more first signal measurements on the serving cell are above the first signal threshold, and when the one or more second signal measurements on the serving cell are above the second signal threshold, and
  send the information associated with the N layers, to the wireless device.

* * * * *